(12) United States Patent
Wang et al.

(10) Patent No.: US 11,952,001 B1
(45) Date of Patent: Apr. 9, 2024

(54) AUTONOMOUS VEHICLE SAFETY SYSTEM VALIDATION

(71) Applicant: Zoox, Inc., Foster City, CA (US)

(72) Inventors: Chuang Wang, Woodside, CA (US); Leonardo Poubel Orenstein, San Mateo, CA (US); Tod Cameron Semple, Woodside, CA (US); James Graham Dolan, Foster City, CA (US); Takahiro Baba, Palo Alto, CA (US); Matthew Lotocki, San Francisco, CA (US)

(73) Assignee: ZOOX, INC., Foster City, CA (US)

( * ) Notice: Subject to any disclaimer, the term of this patent is extended or adjusted under 35 U.S.C. 154(b) by 331 days.

(21) Appl. No.: 17/522,703

(22) Filed: Nov. 9, 2021

(51) Int. Cl.
| | |
|---|---|
| *B60W 50/035* | (2012.01) |
| *B60W 60/00* | (2020.01) |
| *G05B 17/02* | (2006.01) |
| *G07C 5/00* | (2006.01) |
| *G07C 5/08* | (2006.01) |
| *B60W 50/00* | (2006.01) |

(52) U.S. Cl.
CPC ...... *B60W 50/035* (2013.01); *B60W 60/0015* (2020.02); *G05B 17/02* (2013.01); *G07C 5/008* (2013.01); *G07C 5/085* (2013.01); *B60W 2050/0088* (2013.01)

(58) Field of Classification Search
CPC ........... B60W 50/035; B60W 60/0015; B60W 2050/0088; G05B 17/02; G07C 5/008; G07C 5/085

USPC .......................................................... 701/26
See application file for complete search history.

(56) References Cited

U.S. PATENT DOCUMENTS

| | | | | |
|---|---|---|---|---|
| 2012/0156653 A1* | 6/2012 | Wokurka | ................. | G09B 9/16 |
| | | | | 434/30 |
| 2016/0210382 A1* | 7/2016 | Alaniz | .................... | G09B 9/048 |
| 2016/0314224 A1* | 10/2016 | Wei | ....................... | G05D 1/0088 |
| 2018/0157770 A1* | 6/2018 | Kim | ......................... | G06F 30/20 |
| 2018/0339712 A1* | 11/2018 | Kislovskiy | ............. | H04L 67/34 |
| 2019/0220011 A1* | 7/2019 | Della Penna | ........ | G05D 1/0212 |
| 2020/0050536 A1* | 2/2020 | Nygaard | ............. | G06F 11/3684 |
| 2020/0349057 A1* | 11/2020 | Nygaard | ............. | G06F 11/3692 |

* cited by examiner

*Primary Examiner* — Muhammad Shafi
(74) *Attorney, Agent, or Firm* — Lee & Hayes P.C.

(57) ABSTRACT

Driving simulations may be generated based on driving log data and used to validate autonomous vehicle safety systems. A driving simulation system may receive driving log data from autonomous vehicles and determine events which caused a vehicle to diverge from a planned trajectory. Driving simulations may be generated based on the driving log data, and executed using a simulated vehicle that follows the initial planned trajectory of the autonomous vehicle. The driving simulations may be analyzed to detect potential collisions and near misses, and to determine success conditions for the behaviors of vehicle safety systems. Driving simulations and associated success conditions may be aggregated and used in validation suites for vehicle controllers and/or vehicle safety systems, thereby providing more comprehensive and robust autonomous vehicle validation based on real-world driving scenarios.

20 Claims, 17 Drawing Sheets

Vehicle Safety System – Simulation Scenario Tests 502

| Driving Scenario | Success Condition | Activation Time Threshold |
|---|---|---|
| Intersection Scenario ABC | Safety System Activation | 2.3 – 2.5 Secs |
| Intersection Scenario DEF | No Activation | N/A |
| ... | ... | ... |

Vehicle Safety System Results 504

| Safety System Modality | Activation? | Activation Time |
|---|---|---|
| Modality 1 | No | N/A |
| Modality 2 | Yes | 2.35 Secs |
| Modality 3 | Yes | 2.57 Secs |

AUTONOMOUS VEHICLE SAFETY SYSTEM VALIDATION

BACKGROUND

Safety of passengers in a vehicle and other people or objects in proximity to the vehicle are of the utmost importance. Such safety is often predicated on an accurate detection of a potential collision and timely deployment of a safety measure. To safely operate, an autonomous vehicle may include multiple sensors and various systems for detecting and tracking events surrounding the autonomous vehicle and may take these events into account when controlling the autonomous vehicle. For example, the autonomous vehicle may detect and track every object within a 360-degree view of a set of cameras, lidar sensors, radar, and/or the like to control the autonomous vehicle safely.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 5 depicts two tables including example simulation scenario test data and validation results associated with vehicle safety systems, in accordance with one or more implementations of the disclosure.

DETAILED DESCRIPTION

Figure 1:
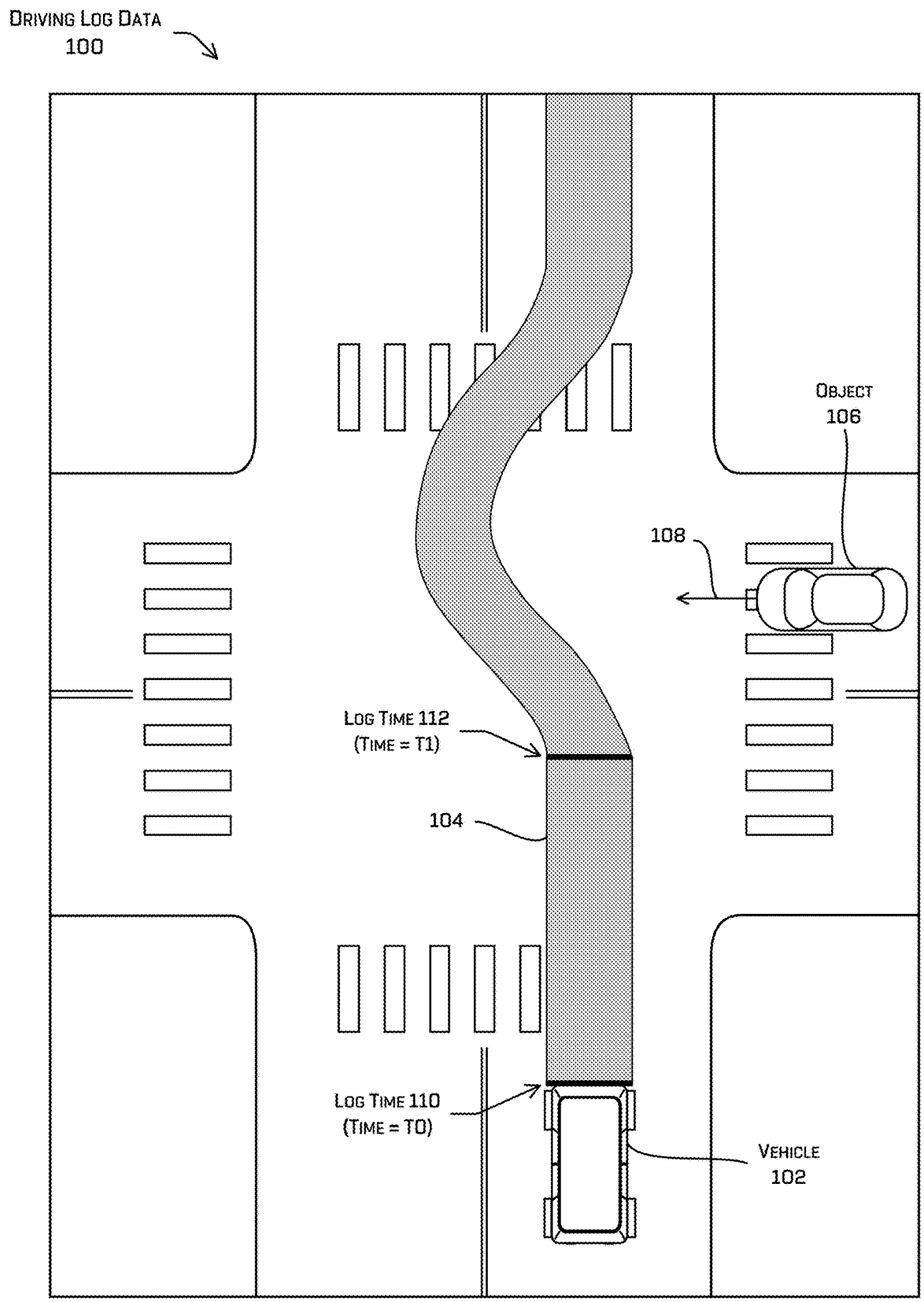
FIG. 1 is an example representation of driving log data associated with a vehicle operating in an environment, in accordance with one or more implementations of the disclosure.

Various techniques described herein relate to generating driving simulations based on driving log data, and using the driving simulations to generate, update, and/or improve vehicle safety systems operating within autonomous vehicles. In some examples, a driving simulation system may receive log data from autonomous vehicles operating within driving environments, and may analyze the log data to determine events in which an autonomous vehicle diverged from a planned trajectory based on the route of the vehicle. Such divergences may include activations of a safety system within the autonomous vehicle, and/or disengagement of the autonomous driving functionality by a human driver or safety operator. The simulation system may generate a driving simulation based on the driving log data associated with a divergence from a planned trajectory. The driving simulation may be executed using a simulated vehicle that follows the initial planned trajectory rather than diverging from it, and the simulation may be analyzed to determine success conditions for a safety system of an autonomous vehicle. For instance, driving simulations may be analyzed to detect potential collisions, near misses, and/or other instances in which a vehicle safety system should or should not be activated based on the simulation, as well as timing thresholds for activating the vehicle safety system. Various driving simulations and associated success conditions determined based on the log data may be aggregated and used in validation test suites for vehicle controllers and vehicle safety systems, thereby providing more comprehensive and robust validation of autonomous vehicles using real-world driving scenarios.

When traversing a driving environment, an autonomous vehicle may use various sensors to capture sensor data within the environment (e.g., image data, radar data, lidar data, sonar data, etc.), and to identify various objects within the environment. The objects encountered within the environment can include dynamic objects that are moving or capable of movement (e.g., vehicles, motorcycles, bicycles, pedestrians, animals, etc.), and/or static objects (e.g., buildings, road surfaces, trees, signs, barriers, parked vehicles, etc.). The autonomous vehicle also may include various components configured to determine information about the objects detected in the environment, such as components to identify the objects, determine bounding boxes, perform instance and semantic segmentation, object classification, and the like. For dynamic objects detected within the environment, the autonomous vehicle also may include components to perform object tracking and to generate one or more predicted trajectories for the objects. In some cases, an autonomous vehicle may generate a single predicted trajectory for a dynamic object based on object type, location, pose, velocity, etc. Additionally or alternatively, an autonomous vehicle may generate multiple possible trajectories for a dynamic object, with confidence scores associated with any number of possible trajectories (including all).

Autonomous vehicle systems also may include one or more components to generate trajectories for the autonomous vehicle, based on the destination of the vehicle, road data, and the objects detected in the environment. One or more vehicle trajectories may be generated by the planning component, that the vehicle may follow to traverse the environment safely and legally, while avoiding any possible interactions with the other objects in an environment.

In some examples, an autonomous vehicle may include a vehicle safety system configured to predict potential collisions and other interactions (e.g., near-miss collisions, dangerous maneuvers, etc.) involving the autonomous vehicle and/or other objects in the environment, and to control the autonomous vehicle in response to the potential collisions and/or interactions. For vehicle safety systems to be effective in avoiding or mitigating potential interactions, such systems may be designed to operate quickly both in detecting potential interactions and in controlling the vehicle when a potential interaction is detected. In some cases, vehicle safety systems may be implemented using a secondary computing infrastructure on the autonomous vehicle that is separate from the primary computing infrastructure used for perception, prediction, trajectory planning, etc. In this manner, performance of the safety systems are not impacted by failures or heavy processing loads associated with the primary computing infrastructure. Such examples may provide additional technical advantages based on the independence of the vehicle safety system, in terms of computational output performance, and safety, from the primary vehicle navigation systems, which can provide redundancy, error checking, and/or validation of the primary vehicle systems.

Ensuring that vehicle safety systems operate and perform effectively within autonomous vehicles can be a difficult technical task requiring significant computational and human resources. For example, certain vehicle testing systems may collect log data captured by autonomous vehicles to analyze collisions and/or instances in which the vehicle activated a vehicle safety system to avoid a potential collision, and may evaluate the behavior of the vehicle safety system based on the associated log data. However, collisions and safety system activations may be rare for autonomous vehicles operating in real-world environments, which may result in sparse and limited log data scenarios from which to evaluate the performance of the vehicle safety system. Moreover, instances in which a vehicle safety system was activated can be difficult to analyze using driving log data, because the log data does not indicate what would have occurred if the safety system were not activated. Thus, log data cannot determine false positive safety system activations, that is, instances in which a safety system was improperly triggered and activated based on the driving environment.

Additional testing systems may execute synthetic driving simulations (e.g., simulations not based on a driving log data) to test and validate vehicle safety systems. Although synthetic simulations may be used to simulate any number of possible driving scenarios in which to test vehicle safety systems, synthetic simulations by definition do not represent driving scenarios encountered in real-world environments. As a result, synthetic simulations may fail to simulate relevant real-world driving scenarios that could be encountered by a vehicle safety system. Synthetic simulations also may under- or over-represent the likelihood of encountering conditions of different synthetic simulations, and thus may under- or over-calculate the risks of potential collisions, vehicle damage, and/or injuries associated with different vehicle safety system components and/or versions.

To address the problems associated with validating safety systems in autonomous vehicles, the techniques described herein may include executing modified driving simulations based on log data captured in real-world driving environments, to validate the behavior and/or performance of a safety system. In some examples, a simulation system may receive driving log data from one or more autonomous vehicles operating within a driving environment (including real/physical and/or simulated driving environments). As an autonomous vehicle traverses through a driving environment, it may store various log data based on a combination of sensor data and/or vehicle state data. The driving log data of an autonomous vehicle may include data representing the driving environment, the static and dynamic objects observed by the autonomous vehicle, and/or the various internal states of the autonomous vehicle, any of which may be determined and recorded at various different times while the vehicle is traversing the environment.

In some examples, the simulation system may determine driving scenarios within the log data in which the autonomous vehicle diverged from a planned vehicle trajectory. As used herein, a trajectory for a vehicle or other object may refer to a path that the vehicle/object may take through the environment during a future time period. For instance, a trajectory for a vehicle or object may be represented as sequences of locations and corresponding future points in time ($t_1$, $t_2$, $t_3$, etc.) after the current time. In some examples, a trajectory of an autonomous vehicle may include additional information, such as state data for the vehicle (e.g., velocity, acceleration, orientation angle, pose, vehicle controls (such as torques to be applied), etc.) for the future points in time in a trajectory. For an autonomous vehicle, a planned trajectory may refer to trajectory determined by the planning component of the vehicle based on an intended route or destination. The planning component of an autonomous vehicle may implement a planned trajectory by transmitting commands to the drive system components of the vehicle. In contrast, an autonomous vehicle may use a prediction component to determine predicted trajectories for other objects within the environment. The trajectories for other objects may be determined based on the captured sensor data associated with the objects. For instance, an autonomous vehicle may determine an estimated trajectory for a dynamic object (e.g., an object capable of movement) by extrapolating from the current observed trajectory of the object and/or by determining a different possible future trajectory of the object (e.g., taking into account street or traffic features, other objects in the environment, etc.).

A number of possible events or interventions may cause an autonomous vehicle to diverge from a planned trajectory as it traverses an environment. In some cases, a safety system of the autonomous vehicle, configured to detect and avoid potential collisions, may activate to transition the vehicle from the planned trajectory to a contingent trajectory. Contingent trajectories may be generated by the safety system, independently from the planned trajectory, and may be designed to avoid or mitigate potential collisions. In some cases, the contingent trajectories that are pre-generated and pre-validated by the vehicle safety system may be straight-line braking trajectories designed to bring the vehicle to a stop as quickly and safely as possible (e.g., multiple such trajectories may simply apply greater decelerations, up to and including a maximum deceleration, to the instant or previously received trajectory while otherwise maintaining lateral controls the same). In other cases, contingent trajectories may include steering trajectories designed to pull the vehicle off of the road and out of traffic, or combinations of braking and steering trajectories, etc. In other cases, an autonomous vehicle may diverge from a planned trajectory when a driver or safety operator disengages an autonomous driving feature (or functionality) and takes manual control of the vehicle. In some instances, a human driver within an autonomous vehicle or a safety teleoperator monitoring the autonomous vehicle from a remote location, may disengage the autonomous driving functionality in response to a potential collision or other possibly hazardous situation. In still other cases, an external impact to the vehicle or a malfunction of an internal vehicle component may cause an autonomous vehicle may diverge from a planned trajectory.

For any or all of these cases, when an autonomous vehicle diverges from a planned trajectory, the simulation system may determine that the divergence has occurred by analyzing the log data from the autonomous vehicle. In some examples, the log data may include data explicitly identifying events that are associated with changes from planned trajectory. For instance, the log data may include data indicating any activations of the safety system and/or any disengagements of the autonomous driving functionality. Such log data may include an indication of the event that caused the divergence (e.g., a safety system activation or autonomous driving disengagement), and associated event data such as the cause of the event, a new trajectory or new manual operator for the vehicle, the time of the event, the vehicle location, and/or other vehicle state data associated with the event. In these examples, the simulation system may determine that a divergence from a planned trajectory (and/or divergence from any other vehicle state indicative of a nominal operation of the vehicle) has occurred by searching the vehicle log data and identifying a predetermined event (and/or related event data) indicative of the autonomous vehicle diverging from its planned trajectory.

Additionally or alternatively, the log data of an autonomous vehicle may include a trajectory identifier and/or other trajectory data. For instance, the log data may include an intended position, velocity, orientation angle, and the like for the vehicle at one or more future points in time, and/or may include a trajectory name, trajectory identifier, or component identifier for a component that generated the current trajectory being followed by the vehicle at that point in the log. In such examples, the simulation system may determine that a divergence from a planned trajectory has occurred by identifying a point in the log data at which the trajectory identifier and/or other trajectory data changes from the planned trajectory to a different trajectory (or changes to no trajectory). In still other examples, the simulation system may determine a divergence from a planned trajectory implicitly by analyzing the current state data for the autonomous vehicle at periodic points in the log data (e.g., driving directions, velocities, accelerations, angle orientations, vehicle controls, etc.), and detecting a change in the vehicle state data indicative of a change in the vehicle trajectory. Additionally, although these examples describe determining a divergence by the autonomous vehicle from a planned trajectory, in other examples the simulation system may determine a divergence (or change) in any vehicle state, such as change in an observable vehicle behavior or a change in an operational state and/or internal vehicle state of the autonomous vehicle. The simulation system may use the log data to detect any such change in the vehicle state as a divergence event, and may generate and execute a simulation based on the identified divergence event as described below.

When the simulation system determines an event (e.g., an autonomous driving disengagement or a safety system activation) that has caused the autonomous vehicle to diverge from its planned trajectory, the simulation system may use the associated driving log data before and/or after the event to generate a driving simulation. As discussed above, the driving log data may include sensor data, perception data, prediction data, trajectory information, and the like. The simulation system may parse, extract, and filter the driving log data to determine a representation of the driving environment, and the various static and dynamic objects within the environment. In various examples, the simulation system may construct a driving scenario based on portions of the log data associated with a predetermined amount of time (e.g., 2 secs, 3 secs, . . . , 5 secs, . . . , 10 secs, etc.) before and/or after the autonomous vehicle diverged from the planned trajectory.

After the simulation has been generated, the simulation system may execute the simulation using a simulated vehicle configured to continue following the same planned trajectory of the autonomous vehicle throughout the simulation, rather than diverging from the planned trajectory as did the autonomous vehicle. For instance, when the autonomous vehicle diverged from the planned trajectory because a driver or safety operator disengaged the autonomous driving functionality, the simulation would not include the disengagement and the simulated vehicle would continue along the planned trajectory. Additionally, the vehicle safety system of the simulated vehicle may be disabled, so that any potential divergence from the planned trajectory caused by the vehicle safety system need not occur. In some examples, disabling the vehicle safety system of the simulated vehicle may provide advantages even if the vehicle safety system did not cause the divergence of the autonomous vehicle in the log data. For instance, a driver or safety officer may have disengaged the autonomous driving just prior to when a vehicle safety system would have activated, and therefore disabling the vehicle safety system of the simulated vehicle may prevent the safety system from activating and affecting the simulation.

The simulated vehicle may be controlled during the simulation to follow the same or a similar planned trajectory followed by the autonomous vehicle. For instance, in some cases the simulated vehicle may be controlled to follow a trajectory identical to the planned trajectory of the autonomous vehicle. Additionally or alternatively, the simulated vehicle may be configured to follow a trajectory determined independently by a planning component of the vehicle control system(s) associated with the simulated vehicle. A trajectory determined independently by a simulated vehicle may be similar or identical to the trajectory followed by the autonomous vehicle that captured the log data. For instance, although the trajectories may be determined separately by independent planning components, the trajectories may be determined based on a similar or identical destination, with a similar or identical driving scenario, driving conditions, and driving environment including the same or similar static and dynamic objects, etc.

For scenarios in which the simulated vehicle follows an identical or a similar trajectory as the autonomous vehicle, the simulation of the scenario may be started at or before the point where the autonomous vehicle diverged from the planned trajectory, and the simulated vehicle may continue to follow (or track) the same planned trajectory after that point in the simulation. As a result, the simulated vehicle may follow a different trajectory and/or may occupy different locations within the simulated environment than the trajectory followed and positions occupied by the autonomous vehicle in the corresponding log data. Based on the differences in the positions, trajectories, and/or other vehicle state for the simulated vehicle, the simulation system may modify the log data captured by the autonomous vehicle and provide the modified log data as sensor data to the simulated vehicle during the simulation.

For the other dynamic objects in the environment, the simulation system may use the same trajectories for the dynamic objects observed within the log data to control the corresponding dynamic objects in the simulation. For instance, any or all of the trajectory path, velocity, longitudinal acceleration, lateral (or angular) acceleration, and the pose used to control a simulated object may be same as the corresponding dynamic object within the log data. However, in other examples, the simulation system may determine a new trajectory for a dynamic object in the simulation, based on the different trajectory/positions/vehicle states of the simulated vehicle. For instance, as the path of the simulated vehicle in the simulation diverges from the path taken by the autonomous vehicle in the log data, the difference in the paths may affect the behaviors of other vehicles, bicycles, or pedestrians in the environment. In various examples, the simulation system may determine new trajectories for simulated objects and/or may convert simulated objects to "smart" agents (e.g., by using responsive controls, applying similar techniques used in the vehicle on the agents, and the like), to make these objects more responsive and realistic from the perspective of the simulated vehicle.

By forcing the planner system to follow the same trajectory determined while previously driving (and not diverging therefrom), the simulation is able to both test responsiveness of the safety system to events that it was precluded from reacting to in the real world (e.g., where a safety driver disengaged before the system was able to fire) and/or explore other situations which were not encountered during nominal driving. The simulation system may monitor and analyze the execution of the simulation to determine one or more simulation results and/or success conditions for a vehicle safety system based on the simulation. For example, the simulation results may include a collision between the simulated vehicle and another simulated object, or a near-miss collision identified by the simulated vehicle coming within a predetermined safety buffer (e.g. 0.1 meters, 0.2 meters, . . . , 1 meter, etc.) of another simulated object. Other examples of simulation results may include passenger comfort metrics (e.g., instances of vehicle jerkiness, instances of rapid acceleration or deceleration, etc.), moving violations committed by the simulated vehicle, and/or other potential vehicle safety hazards. Within a particular simulation, the simulation system may determine that one or multiple of the simulation results has occurred at various times during the simulation, or that none of the simulation results occurred during the simulation.

Based on the simulation results, the simulation system may determine success conditions for a vehicle safety system associated with the simulation. The success conditions may correspond to the desired behavior of the vehicle safety system during the simulation. For instance, success conditions may include activating or not activating the vehicle safety system during the simulation. When the success conditions include activating the vehicle safety system, additional success conditions may include one or time thresholds (e.g., a time window) during which the safety system should be activated. As discussed below, in some cases the vehicle safety system also may include multiple independent modalities capable of activating the safety system. For example, different independent modalities within the same vehicle safety system may implement different trained machine-learning (ML) models and/or different heuristics-based algorithms to determine when a combination of the vehicle state, the perceived objects, and the conditions in the environment should cause an activation of the safety system. Additionally or alternatively, the independent modalities of a vehicle safety system may be based on input from different sensor data types (e.g., an image data modality, a lidar data modality, a radar data modality, a hybrid data modality, etc.). In various examples, different success conditions for a vehicle safety system also may be associated with different modalities, indicating that a particular modality is to be activated in accordance with particular modality-specific time thresholds.

In various examples, determining the simulation results and/or the success conditions for the vehicle safety system may be performed using entirely automated processes, or using a combination of the automated and manual processes. As an example, the simulation system may use automated processes to detect a collision or near-miss collision (e.g., within a safety buffer distance) during the simulation, determine the time and location of the collision (or near-miss collision) within the simulation, determine the desired success condition (e.g., activation of the safety system), and determine the activation time threshold(s) based on the collision time and/or other simulation data factors. However, in other examples, in simulation system may receive input from a safety operator via a user interface identifying the simulation results and/or the desired success condition associated with the simulation. For instance, the simulation system may output one or more visual representations of the simulation (e.g., top-down representation, perspective view representation, driver view representation, etc.) via a user interface to a client device, from which a human safety operator may view the simulation and determine a simulation result (e.g., a near-miss, a dangerous maneuver, etc.) and may provide a corresponding success condition (e.g., activating the safety system before a particular simulation time or location, etc.).

After executing the driving simulation and determining the corresponding success condition, the simulation and success condition data may be stored in a vehicle safety system test repository. The simulation test and/or additional simulation tests then may be retrieved and used as part of a test suite for safety system component testing, regression testing, risk analysis testing, etc.

For example, the simulation may be executed within a simulation test for an autonomous vehicle controller including a vehicle safety system. During the simulation test the performance of the vehicle safety system may be observed and validated based on the success conditions associated with the simulation. For instance, a first simulation test may require the vehicle safety system to activate within a particular simulation time window, a second simulation test may require the vehicle safety system to activate within a different time window, a third simulation test may require the vehicle safety system not to activate, and so on. The simulation tests for vehicle safety systems, based on driving log data, can be combined into test suites with other log-based safety system tests, simulation tests, etc., to validate the performance of a vehicle safety system.

As shown in the various examples described herein, these techniques may improve the operation and functioning of autonomous or semi-autonomous vehicles, by improving providing more comprehensive and robust validation of vehicle safety systems based on real-world driving scenarios. For example, a simulation system as described herein may improve vehicle safety system validation by executing simulations based on real-world driving log data representing critical driving scenarios, such as disengagements of the autonomous driving functionality and/or safety system activations. By executing the simulations using simulated vehicles with modified trajectories corresponding to the initial planned trajectories, the simulation system may determine ground truth simulation results and success conditions for the vehicle safety system. This may allow the simulation system to implement many more simulation tests based on realistic and real-world driving scenarios, while also supporting additional robust testing metrics. For instance, the simulation system can determine true positive and false positive simulation results, as well as true negatives and false negatives, for more granular regression testing. The simulation system also may independently evaluate different modalities of the safety system, including validations of time thresholds for safety system activation. These additional metrics provide more robust and granular validation, including support for advanced risk analysis and regression testing, as well as labeling for scenario-specific validation of the safety system.

FIG. 1 depicts an example driving scenario 100 based on driving log data captured by an autonomous vehicle. In this example, the vehicle 102 represents the autonomous vehicle that captured the log data while operating in a physical environment. Vehicle 102 is shown approaching an intersection as the driving scenario 100 begins, and the path 104 represents the driving path followed by the vehicle 102 through the environment over the course of the driving scenario 100. Although a number of additional static and dynamic objects may be present within the driving environment, for the sake of simplicity, this example depicts only one additional object 106. Object 106 is another vehicle in this example, and is proceeding along a trajectory 108 toward the path 104 of the vehicle 102.

At the beginning of the driving scenario 100, the vehicle 102 is proceeding along the path 104 at a first position at a first log time 110 (time to). As the driving scenario 100 continues, the vehicle 102 reaches a second position at second log time 112 (time $t_1$). At the second log time 112, the trajectory of the vehicle 102 diverges from its planned (strait) trajectory through the environment. In this example, at the second log time 112 a driver or safety officer has disengaged the autonomous driving functionality of the vehicle 102, and has manually steered the vehicle 102 to the left. For instance, in this case the human operator may be reacting to the object 106 as it begins to pull into the intersection along the trajectory 108. As the vehicle 102 passes through the intersection, the operator corrects the course back into the appropriate lane and re-engages autonomous driving.

Figure 2A:
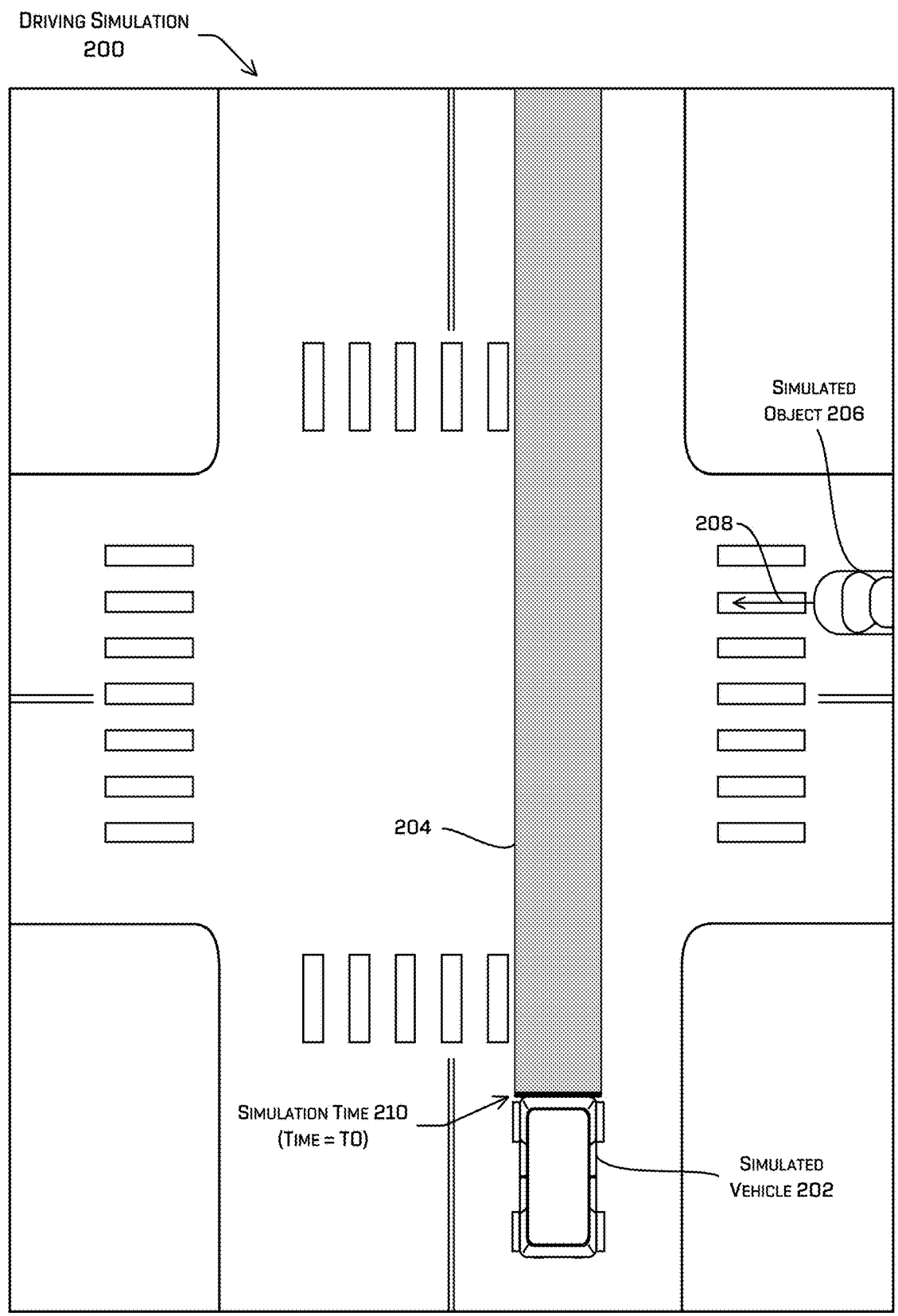
FIGS. 2A-2C illustrate an example representation of a driving simulation resulting in a potential collision, in accordance with one or more implementations of the disclosure.
Figure 2B:
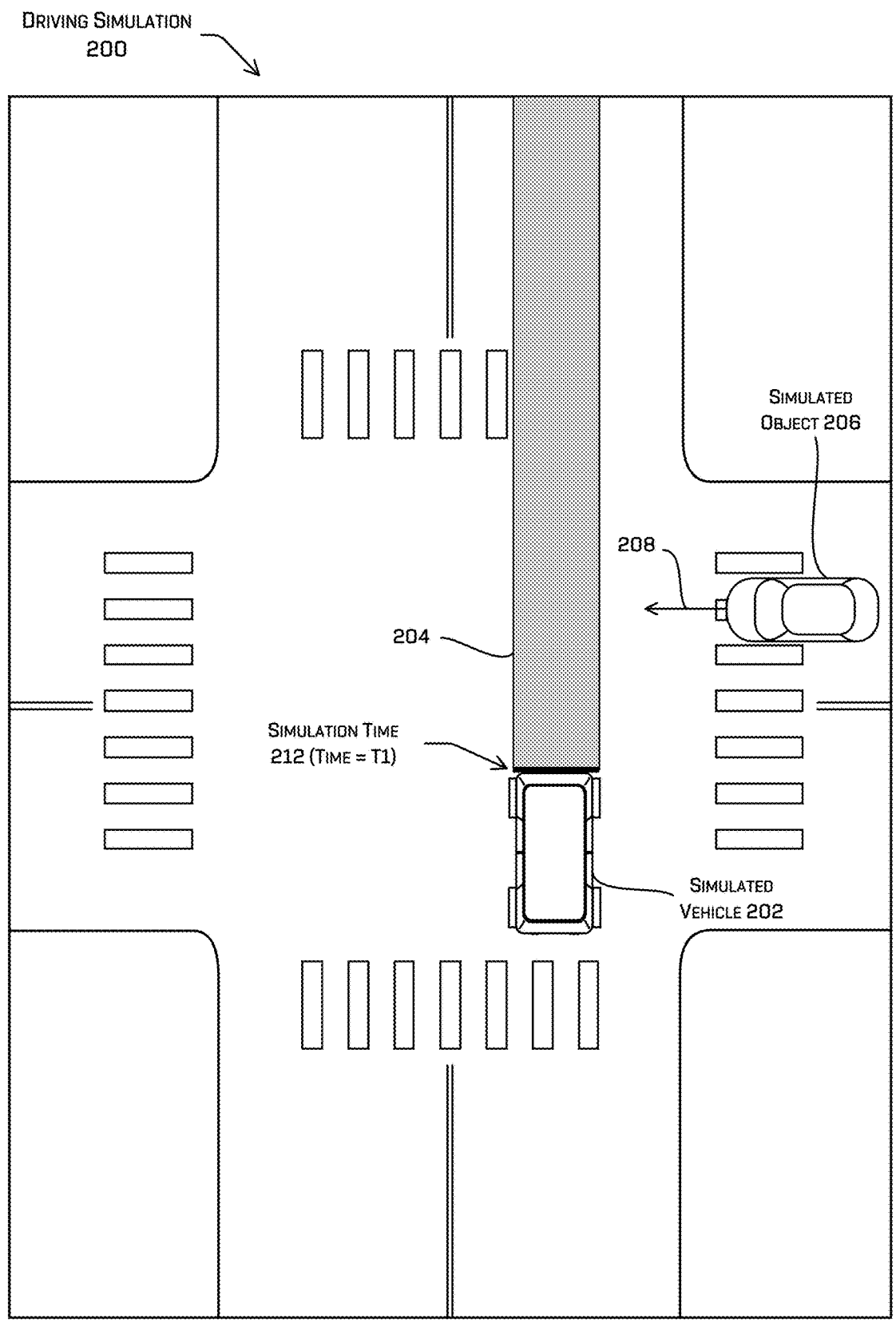
Figure 2C:
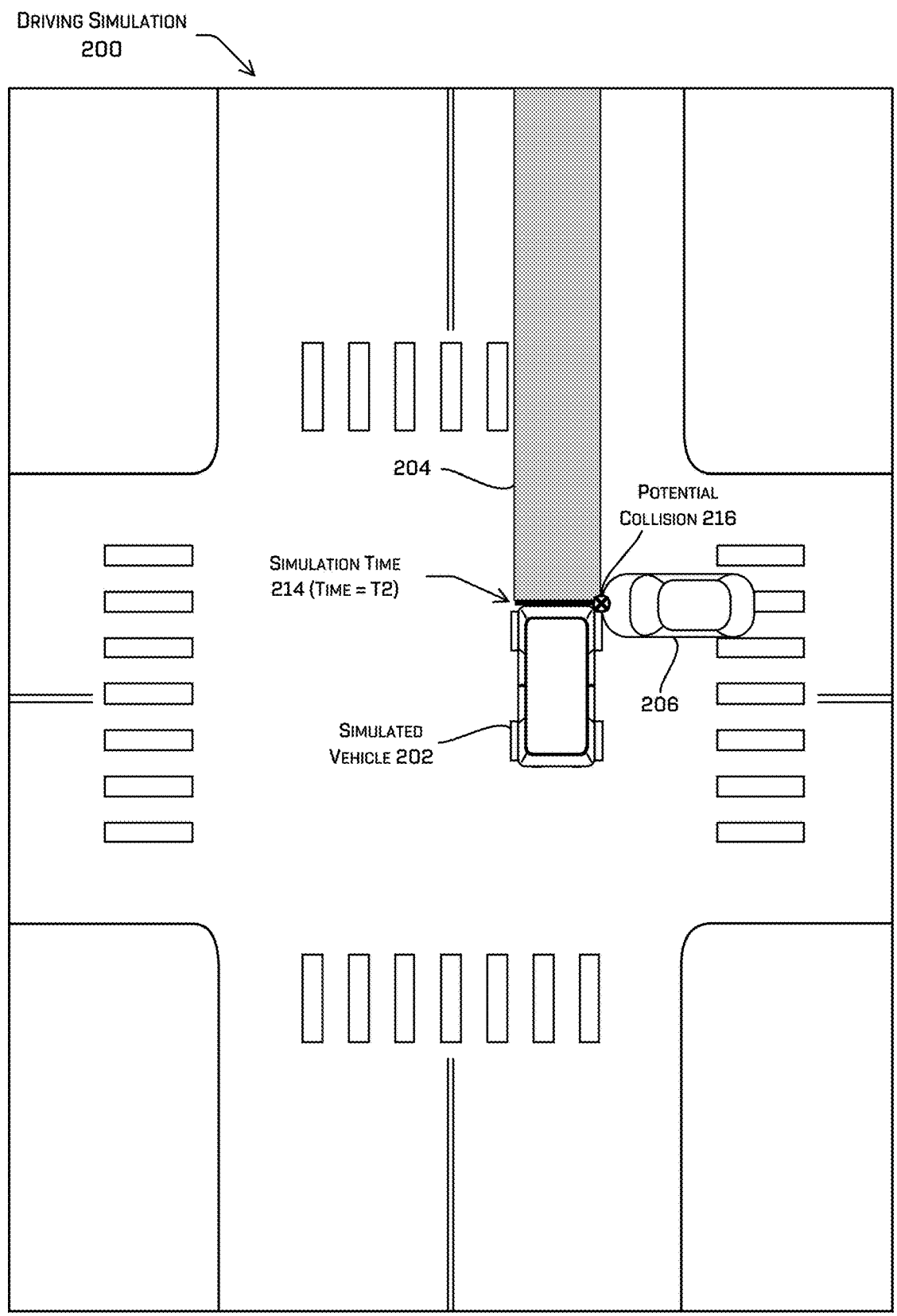

FIGS. 2A-2C depict three different times in an example driving simulation 200. In this example, the driving simulation 200 may be based on the log-based driving scenario 100 discussed above, in which the simulated vehicle 202 may be based on the vehicle 102 and the simulated object 206 may be based on the associated object 106 within the log data. Accordingly, the simulated vehicle 202 may begin the driving simulation 200 at the same position, following the same trajectory, and having the same vehicle state as the autonomous vehicle 102 that captured the log data. Similarly, the simulated object 206 may begin the driving simulation 200 at the same position as the corresponding object 106 in the log data, and following a trajectory 208 similar or identical to the trajectory 108 of the corresponding object 106.

Although the driving simulation 200 in this example may be based on the driving scenario 100, the path 204 of the simulated vehicle 202 is different from the path 104 followed by the vehicle 102. As discussed above, the simulated vehicle 202 may be controlled to follow the same planned trajectory initially followed by the autonomous vehicle 102, and not to diverge from the planned trajectory as did the autonomous vehicle 102. Accordingly, in this example there is no disengagement of the autonomous vehicle for simulated vehicle 202, and the path 204 continues straight and does not steer to the left like the path 104 of the autonomous vehicle 102. Although the planned trajectory in this example is a straight line trajectory through the intersection, it can be understood that in other examples planned trajectories need not be straight lines but can follow any predetermined route through the environment and/or may include any combination predetermined position points, velocities, accelerations, and/or other vehicle states.

FIG. 2A represents the driving simulation 200 at a first simulation time 210 (time $t_0$). At the first simulation time 210, the simulated vehicle 202 is at a first position approaching the intersection, and the simulated object 206 is approaching the same intersection from the right along trajectory 208. In FIG. 2B, the driving simulation 200 is represented at a second simulation time 212 (time $t_1$). At the second simulation time 212, the simulated vehicle 202 is at a second position and has now entered the intersection, and the simulated object 206 is also beginning to enter the intersection along trajectory 208. In FIG. 2C, the driving simulation 200 is represented at a third simulation time 214 (time $t_2$). At the third simulation time 214, the simulated vehicle 202 is at a third position within the intersection, and has collided within the simulated object 206 at a potential collision 216 within the intersection.

As described above, a simulation system may analyze driving simulations in which the simulated vehicle is maintained along the planned trajectory of the autonomous vehicle, to determine a success condition for a vehicle safety system. In this example, because the driving simulation 200 results in a potential collision between the simulated vehicle 202 and the object 206, the simulation system may determine that the success condition for the driving simulation 200 is to activate a vehicle safety system to avoid the potential collision 216. The success condition in this case also may include a time threshold (and/or time window) for activating the vehicle safety system, which may be based on the simulation time of the potential collision 216. For instance, the simulation system may determine a time threshold for activating the vehicle safety system in driving simulation 200 as N seconds before the third simulation time 214, wherein N may be based on the speed of the simulated vehicle 202 and/or other conditions within the simulated environment (e.g., the speed of the object 206, the road conditions, the weather conditions, etc.).

Figure 3:
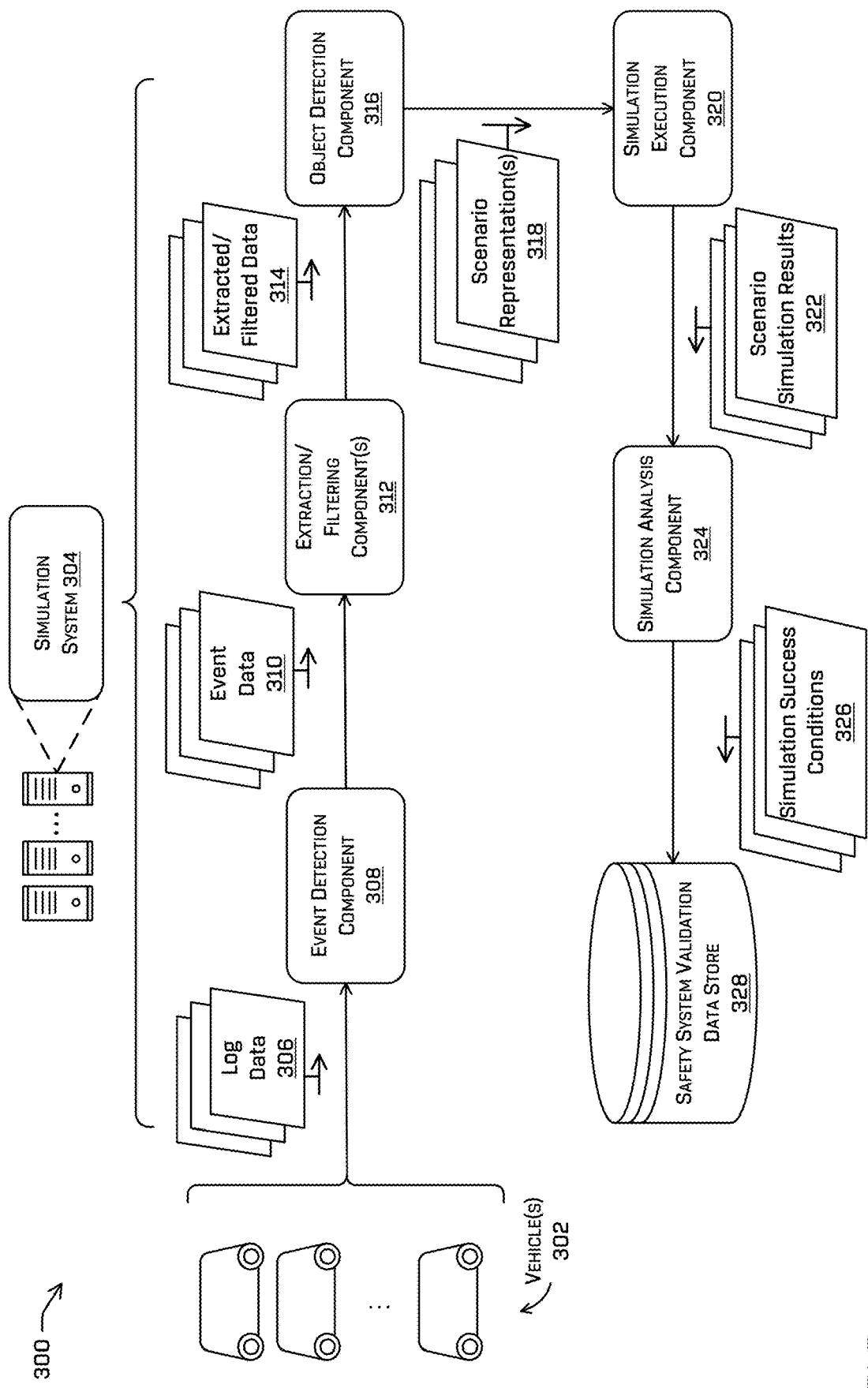
FIG. 3 illustrates example components of a simulation system configured to generate and execute driving simulations based on driving log data including events, in accordance with one or more implementations of the disclosure.

FIG. 3 is an example block-diagram illustrating an example architecture of a scenario generation and analysis system 300 configured to generate, execute, and analyze simulations based on log-data representations of driving scenarios. As discussed above, simulation scenario generation and analysis may assist with improving overall operations of the autonomous vehicles, and in particular for validating the performance of vehicle safety systems when encountering new or unexpected real-world situations. In this example, one or more vehicles 302 operating on various roadways in real world conditions and environments may be in communication with a simulation system 304 operating separately from the vehicles 302. The vehicles 302, which may or may not include operational vehicle safety systems, may capture and provide log data 306 to the simulation system 304. As discussed above the log data 306 may include sensor data, perception data, prediction data, trajectory information, and the like including any message generated and sent between any components of the vehicle, external to the vehicle, etc.

When the simulation system 304 receives log data 306 from a vehicle 302, the log data 306 may be processed by an event detection component 308. The event detection component 308 may be configured to analyze the log data 306 and determine instances in which the vehicle 302 diverged from a planned trajectory while driving. As noted above, the event detection component 308 may analyze the log data to determine occasions in which the vehicle 302 disengaged its autonomous driving functionality at the request of a driver or remote safety operator, and/or occasions in which the vehicle 302 activated a safety system to avoid a potential collision. The event detection component 308 also may determine instances in which the vehicle 302 diverged from its planned trajectory based on an external impact to the vehicle and/or a malfunction of an internal vehicle component (e.g., a flat tire causing the dynamics of the vehicle to be modified). After identifying an instance (or event) in which the vehicle 302 diverged from its planned trajectory, the event detection component 308 may retrieve, as event data 310, the portion of the log data 306 associated with the event. For example, the event data 310 may include the portion of the log data 306 from N number of seconds before and/or after the divergence event. In some cases, the event detection component 308 may extract the event data 310 as the portion of the log data 306 beginning at the event time (e.g., the log time of event/divergence within the driving log) and continuing to a predetermined number of seconds (e.g., 5 secs, 10 secs, etc.) after the event time.

The event data 310 may be processed by data extraction and/or filtering component(s) 312. The data extraction and/or filtering component(s) 312 may be configured to parse the event data 310 received from the vehicles 302 based on a set time interval (e.g., every 40 milliseconds, every 80 milliseconds, every 200 milliseconds, etc.). For each time interval, the data extraction and/or filtering component(s) 312 may define a set of regions surrounding the vehicle 302. In some cases, the regions may be defined based on lanes designations within the environment and relative to the position of the vehicle capturing the sensor data and generating the log data 306.

In some implementations, the data extraction and/or filtering component(s) 312 may determine an existence of objects within each of the defined or discrete regions. For example, one or more objects may be present in each region. The data extraction and/or filtering component(s) 312 may then determine or identify a classification or type associated with each object in each region. The data extraction and/or filtering component(s) 312 may then select or determine a representative object of each classification or type within each region. Parameters associated with the representative objects and the vehicle 302 as well as features of the environment may be extracted from the event data 310 by the data extraction and/or filtering component(s) 312. For example, the vehicle parameters may include, but are not limited to, current drive mode, current drive state, planned maneuver, total velocity, total acceleration, longitudinal acceleration, lateral acceleration, distance to an intersection, longitudinal acceleration, lateral acceleration, yaw, yaw rate, lane identifier, road identifier, Euclidian position, and the like.

In some examples, the extracted data (e.g., the regions, representative objects, parameters, features, etc.) may then be modeled such as by a statistical modeling technique or, in some cases, by using one or more stochastic model, by the data extraction and/or filtering component(s) 312. For example, the data extraction and/or filtering component(s) 312 may associate the extracted data corresponding to each time interval represented by the event data 310 to one or more models in order to generate extracted/filtered data 314. In some cases, the extracted/filtered data 314 may be sparse data associated with events or arrangements of objects, parameters, and object states relative to the vehicle. In some cases, the data extraction and/or filtering component(s) 312 may perform filtering to remove or prevent non-relevant or impossible/improbable data (such as log data representing physically impossible parameters) from being incorporated into scenario representations. For example, the data extraction and/or filtering component(s) 312 may filter data that represents measurements or distances outside of defined threshold or limitations (e.g., removing data representing a vehicle that is 25 meters long).

An object detection component 316 may receive the extracted/filtered data 314 and may generate a scenario representation 318 which may include vectorized data defining representative objects in the scenario. In some cases, the scenario representation 318 may comprise parameters associated with the vehicle itself, and features of any agents within the scenario and/or the physical environment from which the log data 306 was generated. In some examples, the scenario representation 318 may include a top-down scenario representation, a perspective view representation, and/or a driver view representation, etc. The scenario representation 318 may include image(s) (and/or other types of encodings or representations) that represent the environment at time T-N, and may include one or more bounding boxes and/or contours representing a location and extent (e.g., length and width) of the agents at the indicated times. Further, the scenario representation 318 can include image representations, bounding boxes, and/or contours representing the autonomous vehicle, and/or other objects in the scenario environment. As can be understood, each scenario representation 318 may include any number of static objects (e.g., buildings, trees, curbs, sidewalks, map elements, etc.) or dynamic objects (e.g., agents) in the environment at any time, and is not limited to one agent/bounding box.

In some examples, a scenario representation 318 can further include velocity information associated with the autonomous vehicle and/or any dynamic objects in the environment, which may be represented as a velocity vector associated with the corresponding objects/bounding boxes. The scenario representations 318 also may include additional information representing objects in the environment or states of objects in the environment. For example, scenario representations 318 can include lane information or corridor information indicating that a lane associated with the autonomous vehicle or other object is controlled by a traffic light.

As can be understood, representations of objects within the scenario representation(s) 318 may include image data, graphical images or icons, bounding boxes or bounding contours, or the like. Such representations may be determined based on the objects in an environment can be associated with different locations and/or movement information over time. Accordingly, a scenario representation 318 can include velocity information associated with an object that is the same or different as the corresponding velocity information at a different time. Further, locations of an object within the scenario may be updated throughout the scenario representation, to illustrate a movement of an agent as the agent traverses the environment.

A simulation execution component 320 may receive and execute simulations based on scenario representations 318. In some examples, the simulation execution component 320 may execute a simulation based on a scenario representation 318, including instantiating and controlling a simulated vehicle to follow the planned trajectory of the vehicle 302, rather than diverging from the planned trajectory as did the vehicle 302. Additionally, the simulation execution component 320 may disable the safety system of the simulated vehicle in some cases, to avoid any potential divergence from the planned trajectory during the simulation. During the simulation, the simulation execution component 320 may control the simulated vehicle through the simulated environment of the scenario representation 318, following the planned trajectory of the vehicle 302, and applying the same object states and trajectories for other objects within the scenario representation 318.

The simulation execution component 320 may output scenario simulation results 322 based on monitoring the execution of the scenario simulation. As noted above, the scenario simulation results 322 may include simulation results associated with potential collisions involving the simulated vehicle and/or other possible safety hazards. For instance, scenario simulation results 322 may include an indication of a collision during the simulation and/or a near-miss collision. Additionally or alternatively, the scenario simulation results 322 may include indications that the simulated vehicle performed a dangerous maneuver, violated one or more passenger comfort metrics, committed a moving violation, and/or any other outcome from the scenario simulation that may be relevant to determining whether or not to activate a vehicle safety system. The scenario simulation results 322 also may include the simulation times and/or simulation locations associated with any of the scenario simulation results or outcomes (e.g., a potential collision timestamp and location, etc.).

The simulation analysis component 324 may analyze the execution of the simulation and/or the scenario simulation results 322, to determine one or more success conditions for a vehicle safety system associated with the scenario simulation. As discussed above, the success conditions may correspond to the desired behavior of the vehicle safety system during the simulation. Examples of success conditions may include activating or not activating the vehicle safety system, and may include particular time thresholds (or time windows) for activating the safety system. As noted above, the simulation analysis component 324 may determine the simulation success conditions 326 using entirely automated processes, or using a combination of automated and manual processes. For instance, the simulation analysis component 324 may determine success conditions automatically when a collision or a near-miss collision is detected (e.g., with a safety buffer distance), based on heuristics associated with the confidence score associated with the potential collision, the speeds of the vehicles at the time of the potential collision, etc. In other cases, the simulation analysis component 324 may provide a user interface including a rendering of the simulation execution and/or scenario simulation results 322 to a client device of a safety operator, and may receive input via a user interface data identifying the desired success condition for the simulation.

The safety system validation data store 328 may receive and store simulation tests based on the execution of the scenario simulations, as well as the associated success conditions determined by the simulation analysis component 324. The safety system validation data store 328 may store any number of driving simulations and associated success conditions as a test suite to perform simulation testing and validation on vehicle safety systems. As noted above, the structure of the safety system validation data store 328 may include support for real-world driving risk analytics based on the performance of the vehicle safety system, and may include labeling for more granular testing of vehicle safety systems in different driving environments, conditions, and scenario types.

FIGS. 4A-4D depict four different times in an example driving simulation test 400. In this example, a driving simulation test is performed to validate the functionality and performance of a vehicle controller and/or vehicle safety system, based on a driving simulation and success conditions previous determined by the simulation system 304. In this example, the driving simulation test 400 may represent a similar or identical simulation to the driving simulation 200 described above in FIGS. 2A-2C. However, as described above, FIGS. 2A-2C represented an execution and analysis of the driving simulation 200, in order to determine success conditions for the vehicle safety system. In this example, driving simulation test 400 is performed using a previously generated simulation and previously determined success conditions, in order to validate the behavior/performance of a vehicle safety system. Accordingly, unlike driving simulation 200 in which the safety system of the simulated vehicle 202 may be disabled, in this example, the simulated vehicle 402 is controlled by an autonomous vehicle controller(s) including an enabled vehicle safety system. However, like the driving simulation 200, the simulation driving test 400 includes a simulated vehicle 402 controlled based on the autonomous vehicle controller(s) and does not receive a disengagement command from a driver or safety officer.

In this example, the driving simulation test 400 also may be based on the log-based driving scenario 100 discussed above. The simulated vehicle 402 may begin the driving simulation test 400 at the same position, following the same trajectory 404, and having the same additional vehicle states as the autonomous vehicle 102 that captured the log data upon which the simulation is based. Similarly, the simulated object 406 may begin the driving simulation test 400 at the same position as the corresponding object 106 in the log data, and following a trajectory 408 similar or identical to the trajectory 108 of the corresponding object 106. As in driving simulation 200, the simulated vehicle 402 in the driving simulation test 400 may be controlled to follow the same planned trajectory initially followed by the autonomous vehicle 102, and not to diverge from the planned trajectory as did the autonomous vehicle 102.

Figure 4A:
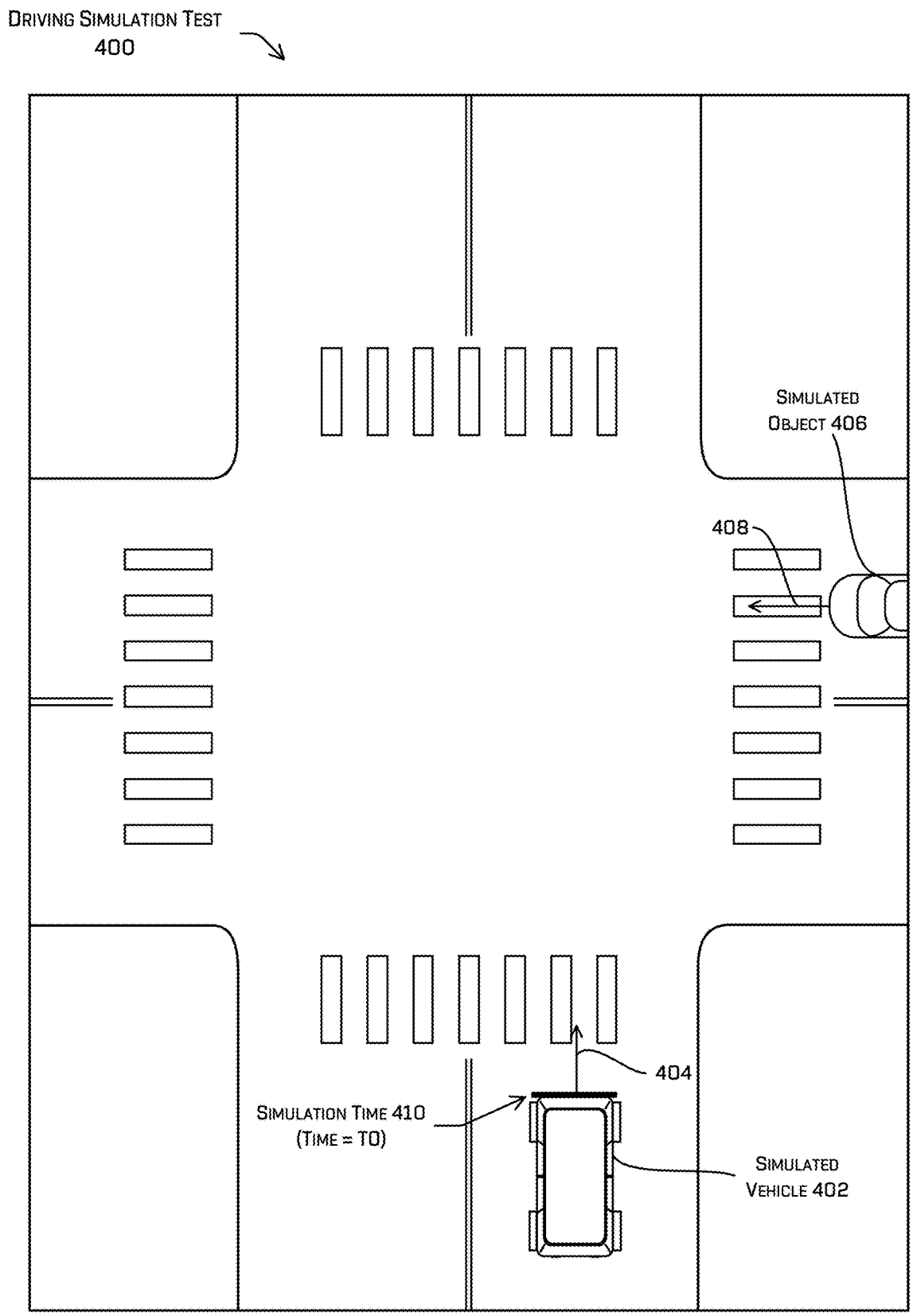
FIGS. 4A-4D illustrate an example representation of a driving simulation in which a simulated vehicle activates a safety system to avoid a potential collision, in accordance with one or more implementations of the disclosure.
Figure 4B:
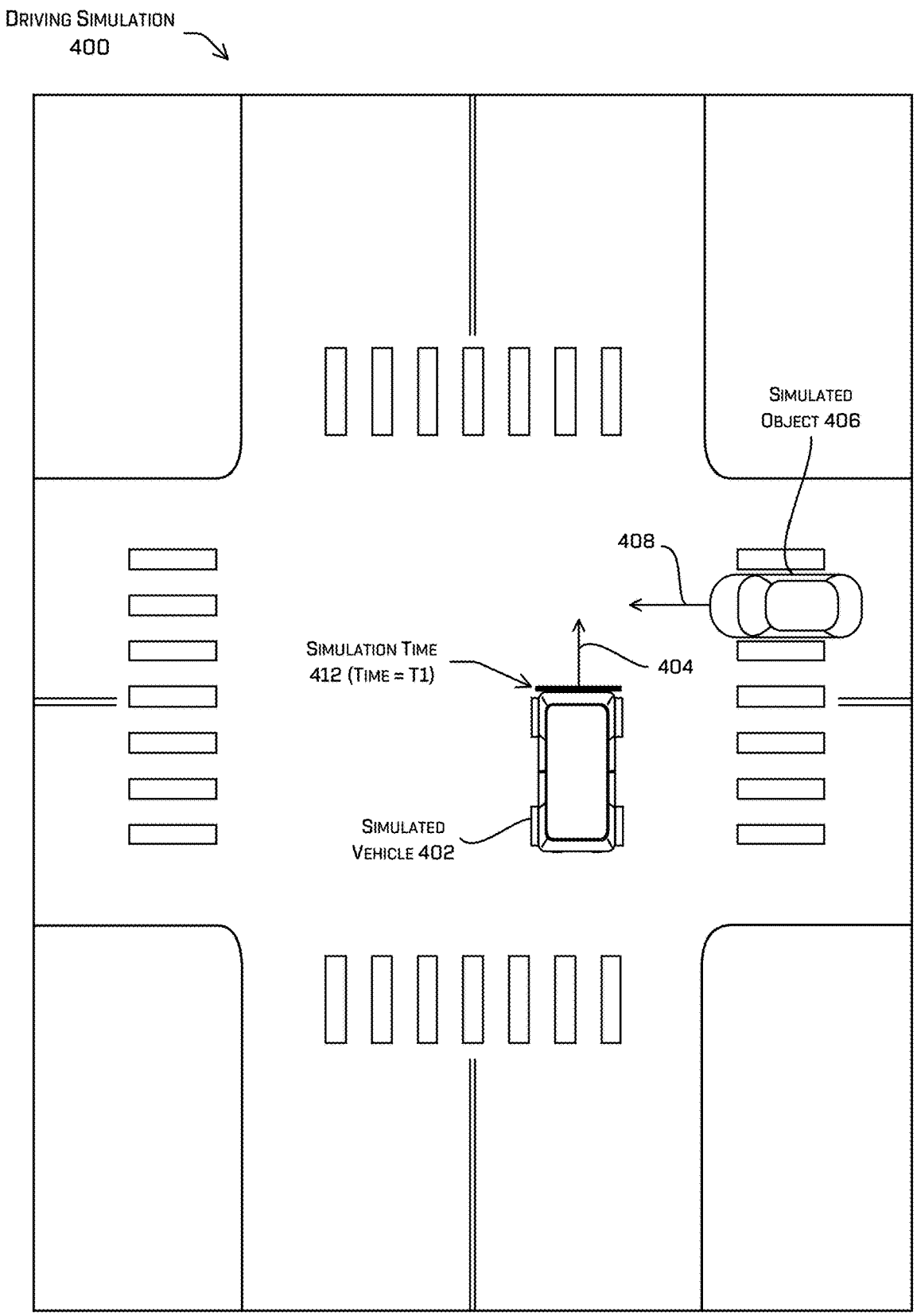

FIG. 4A represents the driving simulation test 400 at a first simulation time 410 (time t0). At the first simulation time 410, the simulated vehicle 402 is at a first position approaching the intersection, and the simulated object 406 is approaching the same intersection from the right along trajectory 408. In FIG. 4B, the driving simulation test 400 is represented at a second simulation time 412 (time $t_1$). At the second simulation time 412, the simulated vehicle 402 is at a second position and has now entered the intersection, and the simulated object 406 is also beginning to enter the intersection along trajectory 408. At or near the second simulation time 412, the simulated vehicle 402 detects a potential collision with the simulated object 406, and activates a vehicle safety system to transition the simulated vehicle 402 to a contingent trajectory to bring the simulated vehicle 402 to a stop to avoid the potential collision.

Figure 4C:
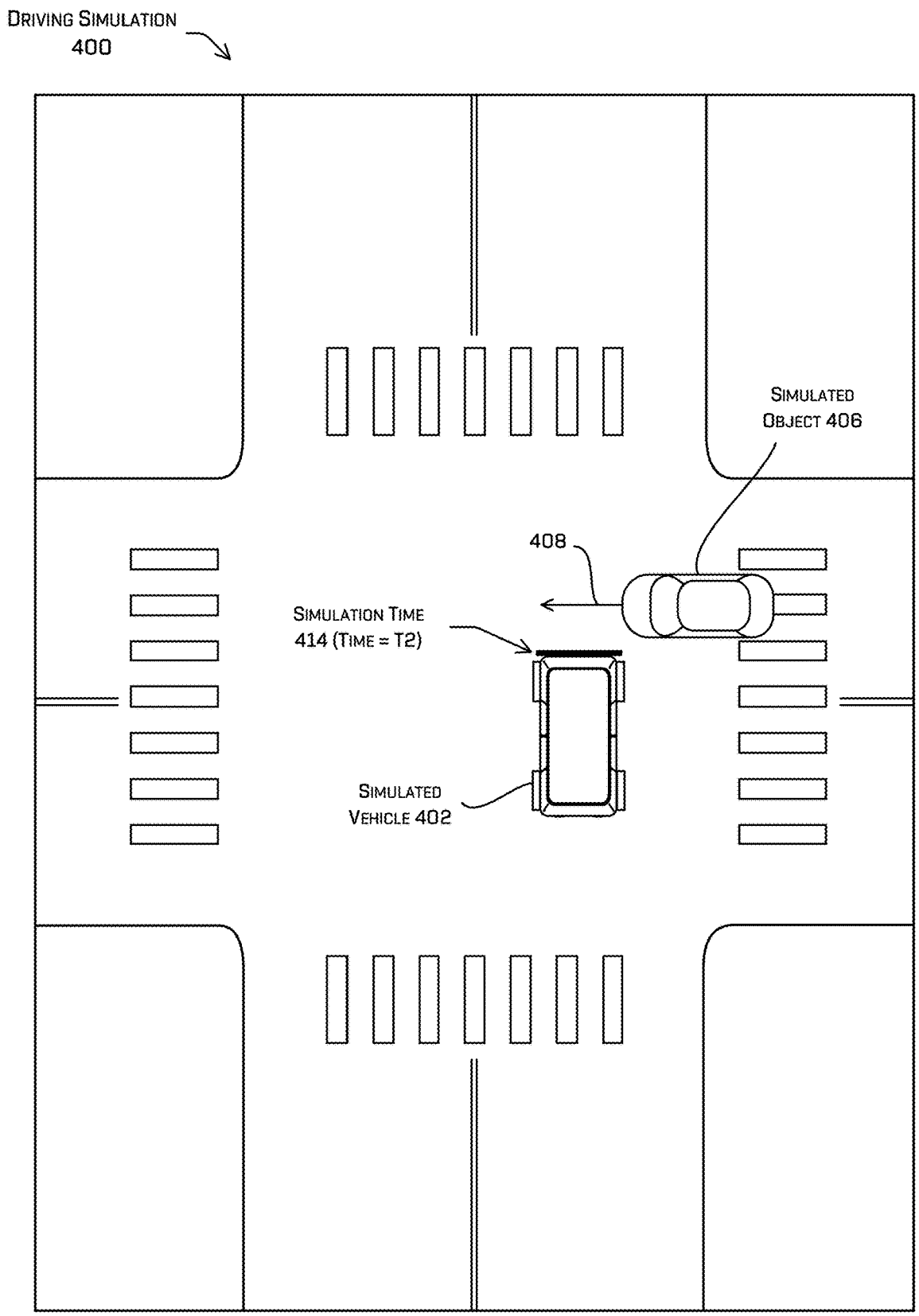
Figure 4D:
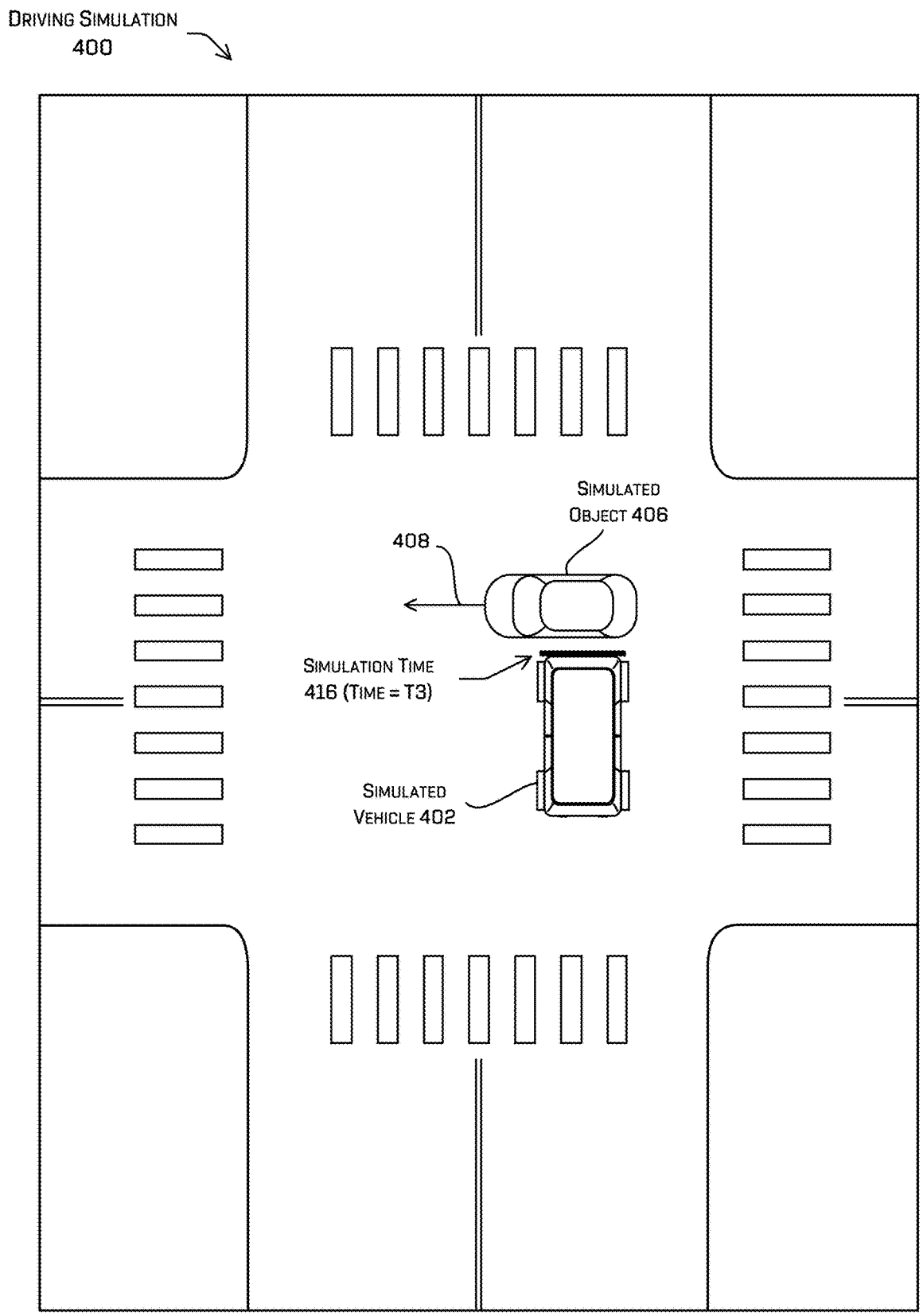

In FIG. 4C, the driving simulation test 400 is represented at a third simulation time 414 (time $t_2$). At the third simulation time 414, the simulated vehicle 402 is at a third position within the intersection, and has stopped in front of the path of the simulated object 406, to avoid the potential collision. In FIG. 4D, the driving simulation test 400 is represented at a fourth simulation time 416 (time t). At the fourth simulation time 416, the simulated vehicle 402 remains stopped at the third position within the intersection, and the simulated object 406 continues along its trajectory 408 in front of the simulated vehicle 402, confirming that the potential collision has been avoided.

Accordingly, the driving simulation test 400 depicted in FIGS. 4A-4D may be analyzed and classified as a successful test of the vehicle safety system used by the simulated vehicle 402. As shown in this example, the vehicle safety system activated during the driving simulation test 400, and activated before a predetermined time threshold that would allow the simulated vehicle 402 to avoid the potential collision with the object 406.

As discussed above, in some cases a vehicle safety system may include multiple independent modalities capable of activating the safety system. For instance, the vehicle safety system within the simulated vehicle 402 may include a number of independent modalities, any number of which may activate the safety system during the driving simulation test 400. In some examples, the simulation system 304 may be configured to execute simulation tests independently for the different modalities of a vehicle safety system. For instance, multiple identical simulation tests may be run, in sequence or in parallel, in which one of the safety system modalities is enabled and the others are disabled, thereby allowing the simulation system to validate the behavior and performance of individual safety system modalities without their behavior impacting the other modalities during the simulation test.

In the above example depicted in FIGS. 4A-4D, the driving simulation may be generated as a similar or identical driving scenario to the driving scenario log data captured by the autonomous vehicle. For instance, the simulated environment, simulated vehicle, and simulated static and/or dynamic objects may be simulated by the simulation system 304 to closely match the corresponding environment, the vehicle, the static/dynamic objects (and object states or attributes) based on the log data. In some examples, the simulation system 304 may implement a three-dimensional simulation in which the raw sensor data (e.g., image data, lidar point clouds, radar data, etc.) provided to the simulated vehicle is similar or identical to the sensor data captured by the autonomous vehicle.

Additionally or alternatively, the simulation system 304 may determine and/or generate perturbed driving simulations by perturbing one or more features of the driving scenario captured within the log data. Features that may be perturbed in a driving simulation may include perturbing a simulated object in the simulation environment (e.g., attributes or characteristics of the object), perturbing a starting condition of the simulation (e.g., starting locations or velocities of the simulated vehicle and/or a simulated object, etc.), and/or perturbing the behavior of the vehicle system on which the simulation is configured to execute. A perturbed simulation determined by the simulation system 304 may include any combination of perturbations to the driving simulation, including perturbations of any simulation feature (e.g., object, environment, vehicle behavior, etc.), perturbation values of any magnitude, and/or perturbations in any direction.

In some examples, the simulation system 304 may perturb (or modify) the simulated vehicle (e.g., simulated vehicle 202 or simulated vehicle 402) and/or one or more simulated objects (e.g., simulated object 206 or simulated object 406) that potentially interacts with or may other affect the simulated vehicle during the simulation. For instance, the simulation system 304 may determine and apply multiple different types and magnitudes of perturbations to modify or replace the simulated vehicle 402 and/or simulated object 406 with a perturbed vehicle and/or perturbed object. The perturbations used by the simulation system 304 may include one or more positional perturbations (e.g., in the x and/or y directions), size perturbations (e.g., in the x, y, and/or z dimensions), pose perturbations, etc. Multiple different perturbations may be applied to the simulated vehicle 402 and/or simulated object 406, resulting in multiple different perturbed simulations. For instance, a first perturbed simulation may include a position of the simulated object 406 that is perturbed by one foot in the x direction, a second perturbed simulation may include a position of the simulated object 406 that is perturbed by two feet in the y direction, a third perturbed simulation may include a size of the simulated object 406 that is perturbed by one foot in the z direction (e.g., additional height), and so on. In other examples, various other attributes of the objects in the simulation or the simulation environment may be perturbed. For instance, additional perturbed simulations may be based on perturbations to the initial size or velocity of any object(s) in the driving simulation 400, to the size of static obstacles in the driving simulation, or the starting start or time to change for a traffic light in the driving simulation. Additional perturbations may be made during the course of the driving simulation 400, just as in-simulation perturbations to the acceleration and/or trajectory of the simulated vehicle 402 and/or other objects in the driving simulation.

FIG. 5 shows two tables depicting examples of simulation scenario test data and validation results data for a vehicle safety system. In this example, table 502 includes data representing an example set of simulation scenario tests for a vehicle safety system. For any number of driving scenarios in the test suite of simulation tests, table 502 includes an identifier of the driving scenario, a success condition associated with the driving scenario (e.g., vehicle safety system activation or no activation), and an activation time threshold (e.g., for simulation tests in which the success condition is an activation). As shown in this example, any number of simulation tests may be used to validate the behavior and performance of vehicle safety systems. In some cases, the listing of simulation tests within table 502 may include labels associating the tests with different scenario types, different weather conditions, road conditions, etc., to support more robust and granular testing of vehicle safety systems.

Table 504 include data representing the test results for a particular vehicle safety system, based on the execution of a single driving simulation test. For instance, the test results shown in table 504 may correspond to single test of a multi-modality vehicle safety system, based on the driving simulation test 400 (or a similar simulation test). In this example, the vehicle safety system includes three separate modalities capable of activating the vehicle safety system. The first modality in this example did not activate the safety system, the second modality activated the safety system at the timestamp of 2.35 seconds during the simulation, and the third modality activated the safety system at the timestamp of 2.57 seconds during the simulation. Accordingly, based on the example test results in table 504, the simulation system 304 may validate the behavior and performance of the safety system as a whole and/or the individual modalities of the safety system.

Using driving simulation test results like those in table 504, the simulation system may determine not only pass/fail rates for vehicle safety systems. For instance, the simulation system may use the test results in table 504, in combination with the success conditions for the scenario simulations, to determine numbers and rates of true positive activations, false positive activations, true negative activations, and/or false negative activations. These metrics can be determined for the safety system as a whole and/or the individual modalities of the safety system. These metrics can also be used in regression testing to evaluate the performance of a vehicle safety system relative to a previous version, and/or may be used to evaluate the performance of a vehicle safety system in certain driving conditions, certain geographic locations, and/or certain driving scenario types (e.g., fourway stop intersection scenarios, crosswalk scenarios, highway scenarios, unprotected left turn scenarios, etc.).

As noted above, in some cases the simulation system may determine a new trajectory for one or more dynamic objects within a simulation. A new trajectory may differ from the trajectory of the corresponding dynamic object within the log data captured by the autonomous vehicle. For example, in a simulation based on the log-based representation of the driving scenario 100, the object 106 may proceed along the same observed trajectory (e.g., path 104) from the driving log data. However, in other examples, the simulation system 304 may modify the trajectory of the corresponding simulated object. Because the trajectory of the simulated vehicle has been modified from the original trajectory of the autonomous vehicle (e.g., to remain on the planned trajectory), modifications to the trajectories of other simulated objects may make these objects more responsive and realistic from the perspective of the simulated vehicle. In some instances, such modifications may include converting simulated agents to smart agents. Additionally or alternatively, the simulation system 304 may use heuristics-based components to determine new trajectories for simulated objects based on rules relating to acceleration, following distance, driving aggression, and the like. Various techniques and examples of modifying the trajectory and/or states of vehicle and other dynamic objects within scenario simulations can be found, for example, in U.S. patent application Ser. No. 17/184,128, titled "Agent Conversions In Driving Simulations" and filed Feb. 24, 2021, U.S. patent application Ser. No. 17/374,088, titled "Adversarial Agent Controls Generation And Problematic Scenario Forecasting," and filed Jun. 14, 2021, U.S. patent application Ser. No. 16/889,747, titled "Agent Behavior Model For Simulation Control," and filed Jun. 1, 2020, and U.S. patent application Ser. No. 16/457,745, titled "Synthetic Scenario Simulator Based On Events," and filed Jun. 28, 2019, each of which is incorporated by reference herein for all purposes.

In some cases, the simulation system may determine a new trajectory for a simulated object in a driving simulation used to determine the success conditions for a vehicle safety system, such as driving simulation 200 described above in FIGS. 2A-2C. In these cases, one or more new trajectories may be generated for a simulated object (e.g., simulated object 206), and the simulation may be executed multiple times using a different trajectory (or other different state data) in different executions of the simulation. The simulation results may be determined in such cases based on a combination of the results from multiple executions of the simulation using the different object trajectories. For instance, a simulation result may be determined probabilistically based on the outcomes from the multiple executions of the simulation. In contrast to the driving simulation 200 that had a simulation result of a potential collision 216, probabilistically determined simulation results may include probabilities or confidence scores associated with different possible simulation results (e.g., an N % probability of a collision, an N % probability of a near-miss collision, etc.). Additionally, in such cases the success conditions for a vehicle safety system associated with the simulation may be determined based on the probabilistic simulation results. For instance, if a collision probability for a simulation meets or exceeds a probability threshold, then the simulation system may determine that the success conditions include activating a safety system, whereas if the collision probability does not meet or exceed the threshold, then the simulation system may determine that the success conditions include not activating the safety system, and so on.

Additionally or alternatively, new trajectories may be determined for simulated objects during simulations used to validate the performance of vehicle safety systems based on the success conditions, such as driving simulation 400 described above in FIGS. 4A-4C. In such cases, the simulation system 304 may execute a driving simulation multiple times using different simulated object trajectories, to determine the performance of the vehicle safety system.

FIGS. 6A-6D depict four different times in an example driving simulation 600. In this example, the driving simulation 600 may be similar to the driving simulation 200 described above, and may be used to determine the success conditions for a vehicle safety system. Like the driving simulation 200, the driving simulation 600 also may be based on the log-based driving scenario 100 discussed above, so that the simulated vehicle 602 may be based on the vehicle 102 and the simulated object 606 may be based on the associated object 106 within the log data. Similar to the driving simulation 200 described above, in this example the simulated vehicle 602 and simulated object 606 may begin the driving simulation 600 at the same position, following the same trajectories, and having the same vehicle state as the autonomous vehicle 102 and object in the log-based driving scenario 100. The simulated vehicle 602 may then proceed during the driving simulation 600 based on the planned trajectory of the autonomous vehicle 102, without diverging from the planned trajectory based on a disengagement of the autonomous driving functionality or an activation of the vehicle safety system. The simulated object 606 initially proceeds along a trajectory 608 identical to the trajectory 108 of the object 106. However, as shown in this example, the simulated object 606 also may change its trajectory responsive to the different trajectory taken by the simulated vehicle 602.

Figure 6A:
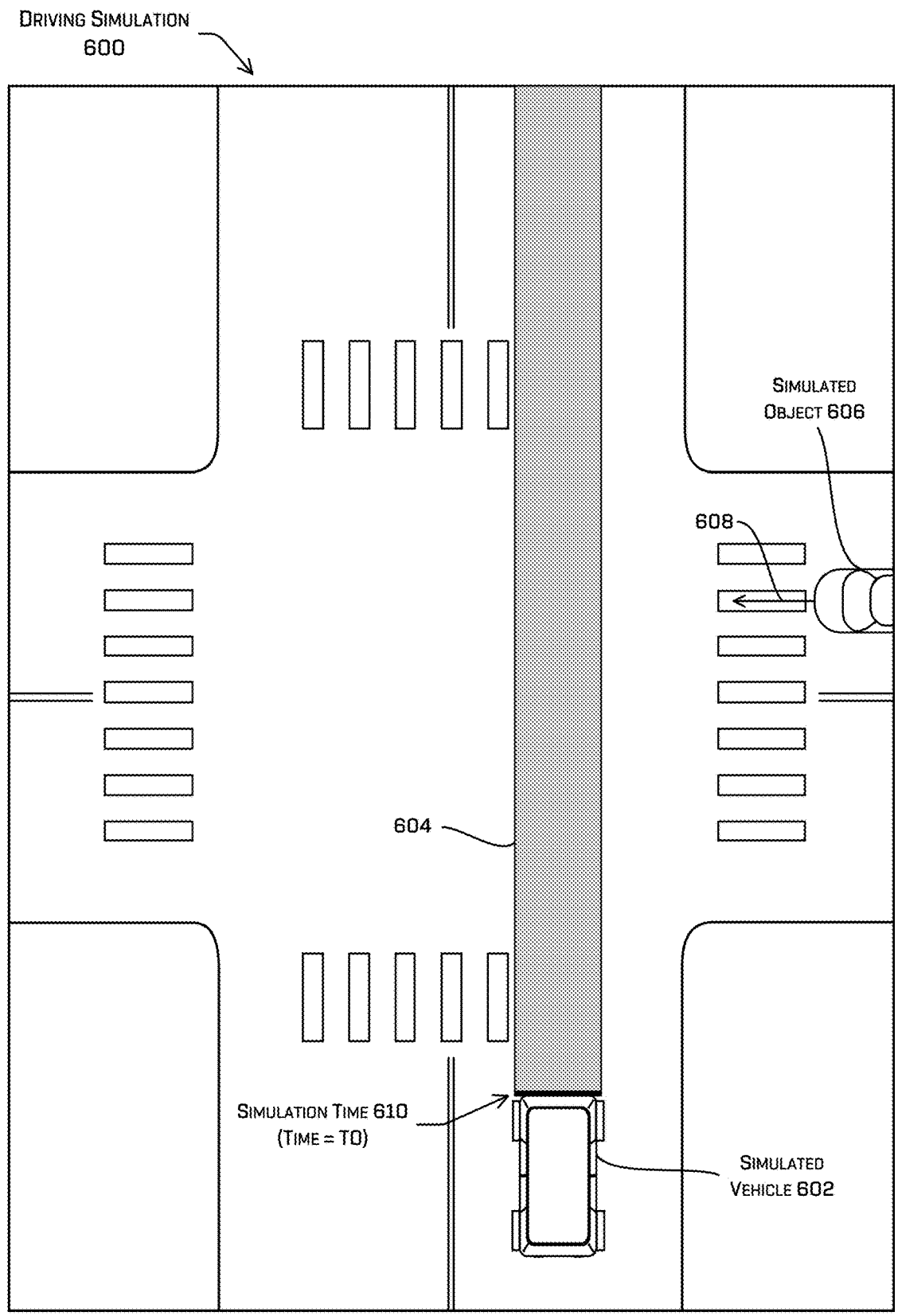
FIGS. 6A-6D illustrate an example representation of a driving simulation in which a simulated object modifies a trajectory to avoid a potential collision, in accordance with one or more implementations of the disclosure.
Figure 6B:
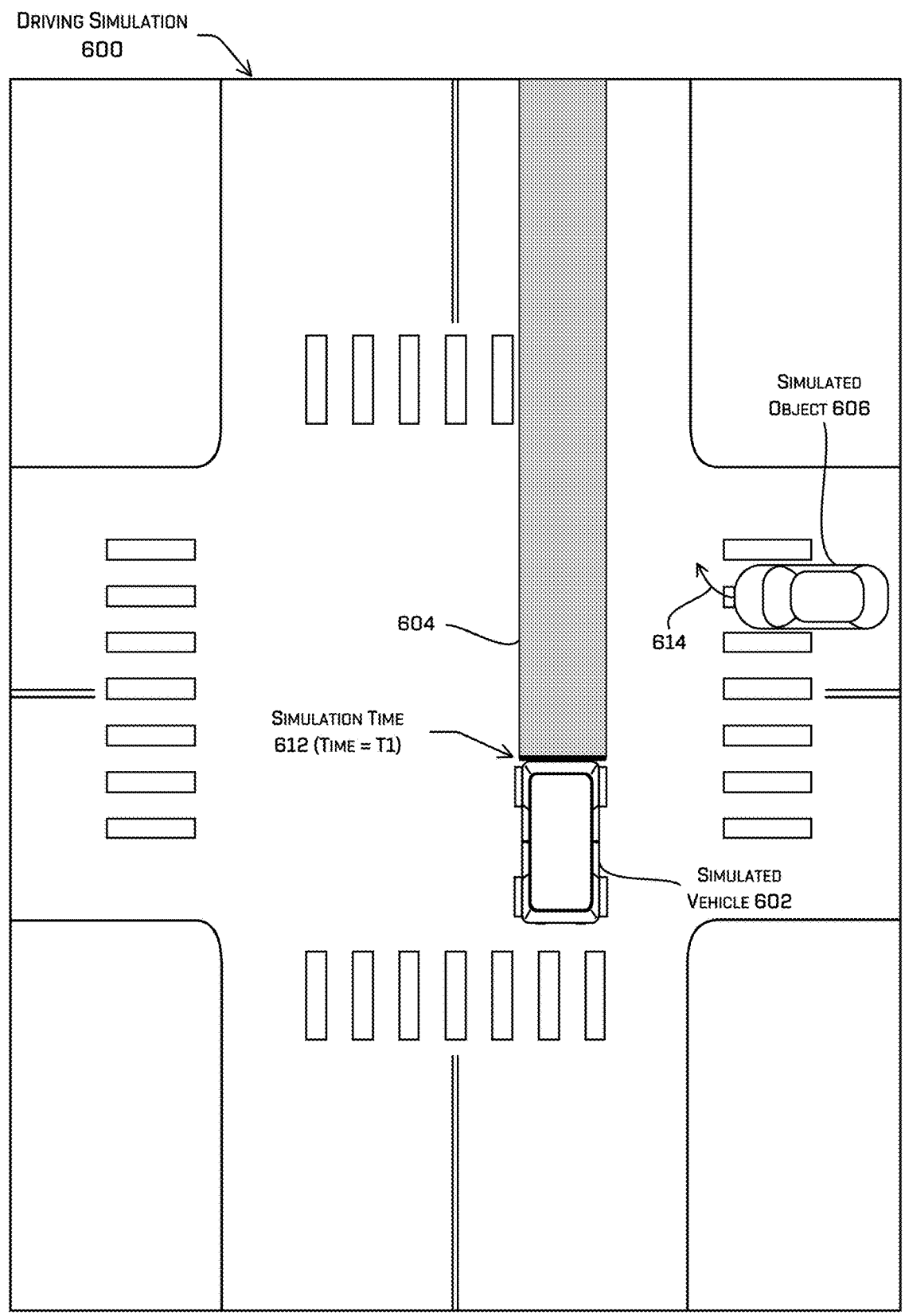
Figure 6C:
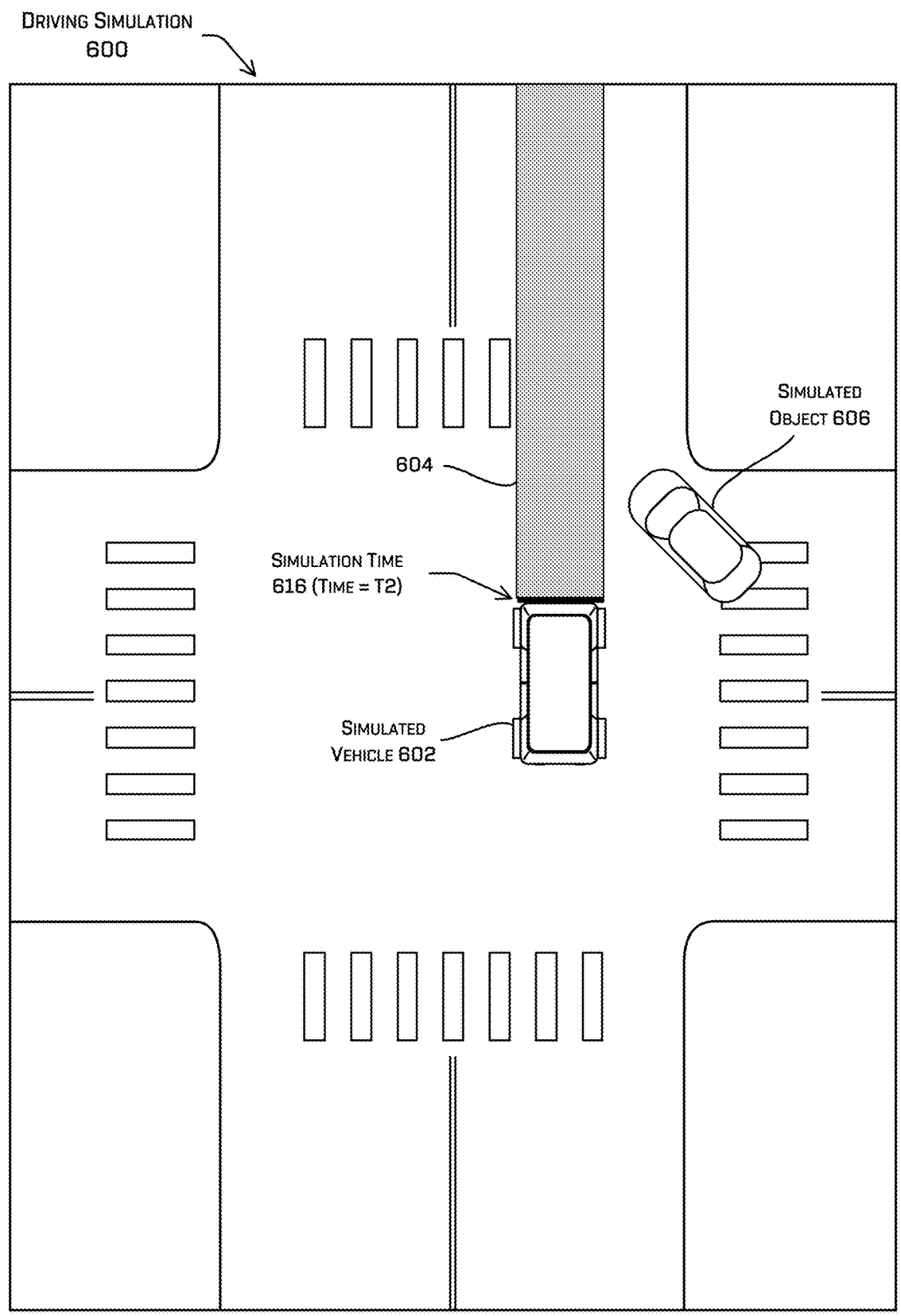
Figure 6D:
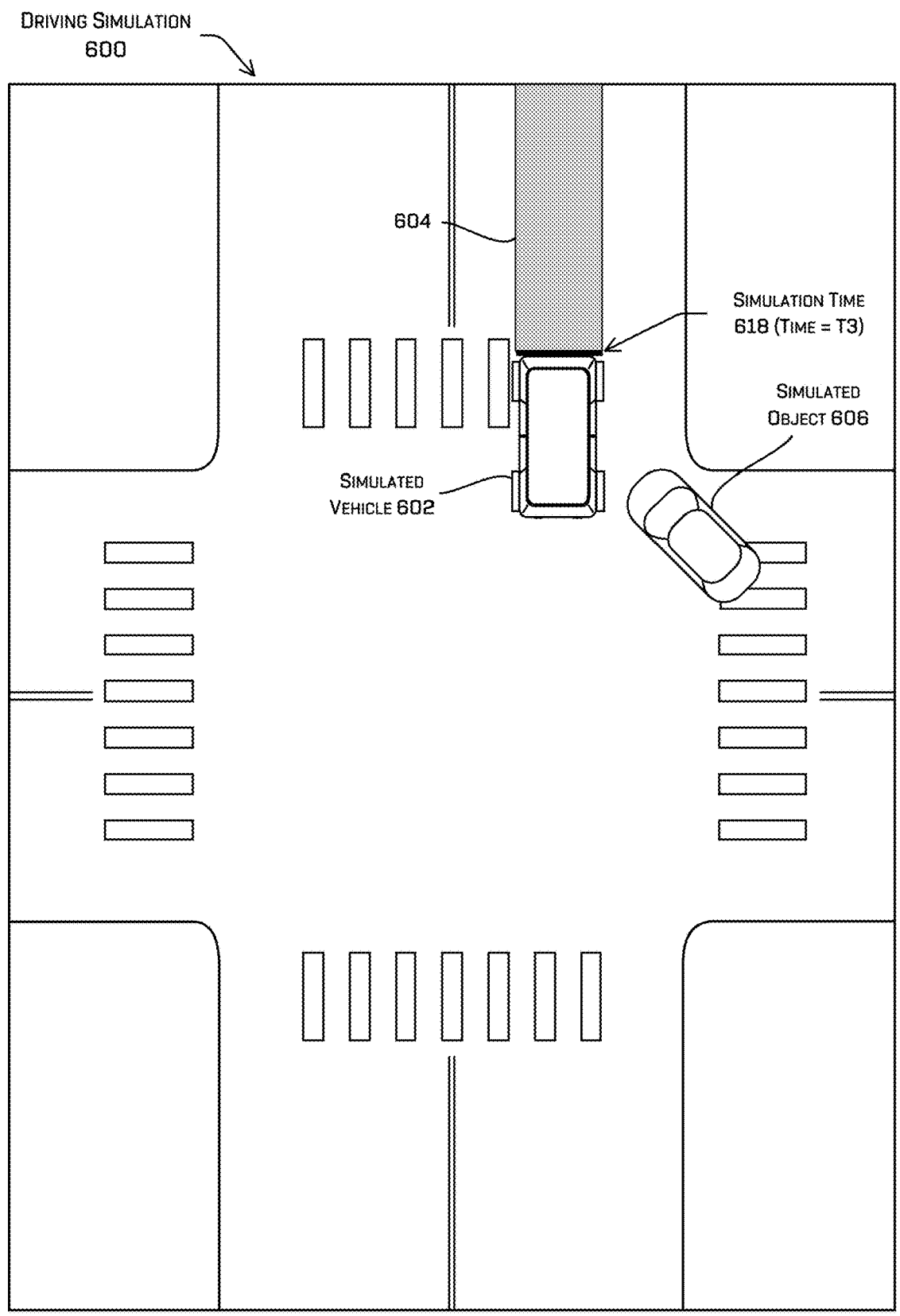

FIG. 6A represents the driving simulation 600 at a first simulation time 610 (time to). At the first simulation time 610, the simulated vehicle 602 is at a first position approaching the intersection, and the simulated object 606 is approaching the same intersection from the right along trajectory 608. In FIG. 6B, the driving simulation 600 is represented at a second simulation time 612 (time $t_1$). At the second simulation time 612, the simulated vehicle 602 is at a second position and has now entered the intersection, and the simulated object 606 is also beginning to enter the intersection. However, as shown in this example, the simulated object 606 is now following a revised trajectory 614 in response to the new (e.g., planned) trajectory being followed by the simulated vehicle 602. In FIG. 6C, the driving simulation 600 is represented at a third simulation time 616 (time $t_2$). At the third simulation time 616, the simulated vehicle 602 is proceeding through the intersection at a third position, and the simulated object 606 has stopped to yield to the simulated vehicle 602. In FIG. 6D, the driving simulation 600 is represented at a fourth simulation time 618 (time $t_3$). At the fourth simulation time 618, the simulated vehicle 602 is existing the intersection at a fourth position, and is still continuing along its original planned path 604. At the fourth simulation time 618, the simulated object 606 remains stopped and has allowed the simulated vehicle 602 to pass, thereby avoiding the potential collision.

As described above in reference to driving simulation 200, the simulation system may analyze the results of the driving simulation in which the simulated vehicle is maintained along the planned trajectory of the autonomous vehicle, to determine success conditions for the vehicle safety system. In this example, unlike in driving simulation 200, the driving simulation 600 did not result in a potential collision between the simulated vehicle 602 and the simulated object 606. However, the result in this example may be based on the simulation system 304 changing the trajectory of the simulated object 606 in response to the simulated vehicle 602. As shown in driving simulation 200, the simulated object 206 might not change its trajectory in some cases. Accordingly, in this example the simulation system 304 may analyze the results of one or multiple driving simulations based on the log-based driving scenario 100, to determine the desired success conditions for the vehicle safety system. If no driving simulations result in a collision or near-miss collision (as in driving simulation 600), then the simulation system 304 may determine that the success conditions includes not activating the vehicle safety system. However, if one or more driving simulations result in a collision or near-miss collision (as in driving simulation 200), then the simulation system 304 may determine that the success conditions should include activating the vehicle safety system. The determination of the success conditions in this example may depend on a number and/or probability of driving simulations that result in a collision or near-miss collision (or other potential safety hazard), and/or may be based on other factors such as the vehicle speeds, driving conditions, risk tolerance configuration of the vehicle safety system, and the like.

Figure 7:
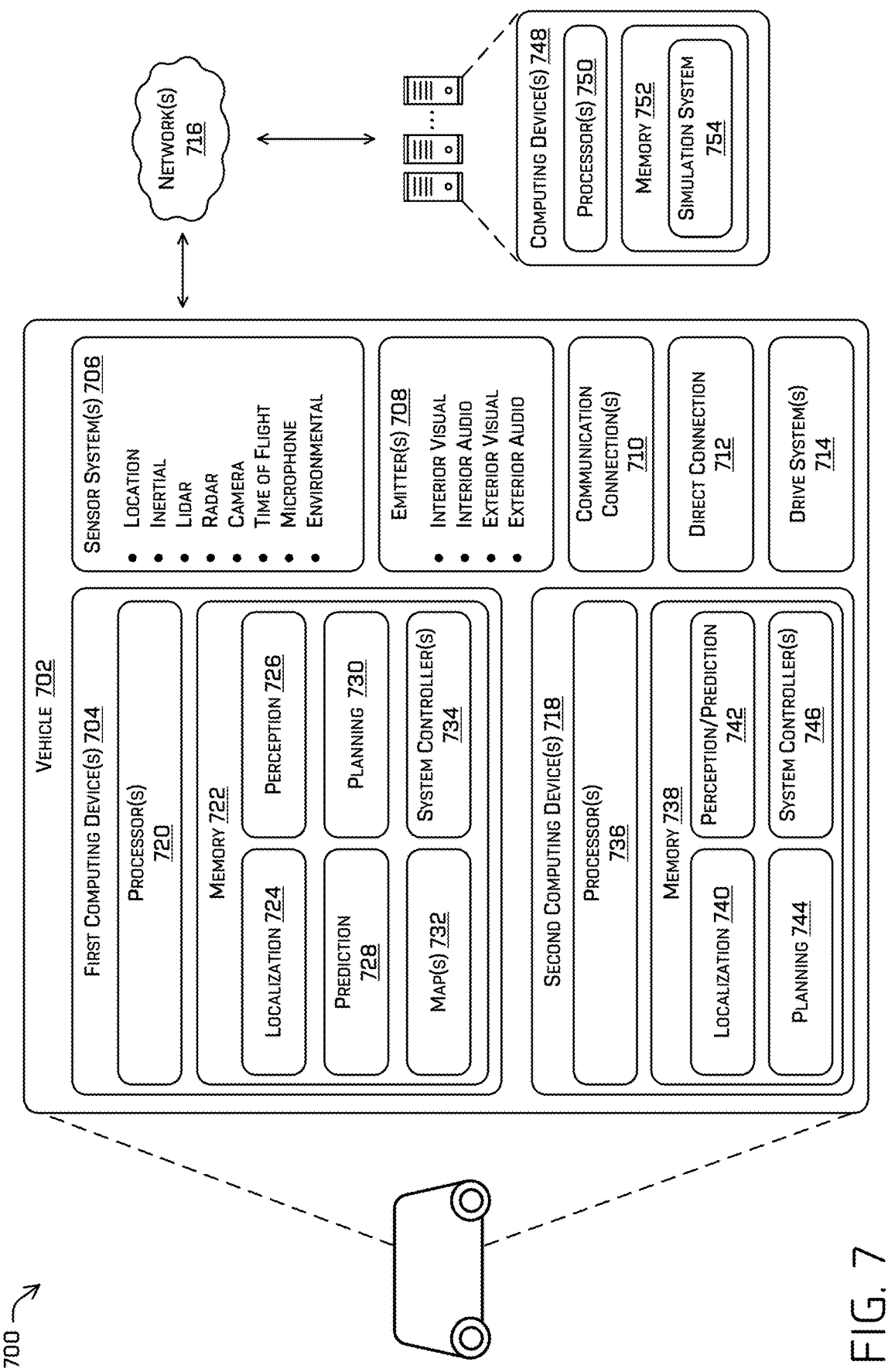
FIG. 7 is a block diagram depicting of an example system for implementing the techniques described herein.

FIG. 7 depicts a block diagram of an example system 700 for implementing various techniques described herein. The system 700 can include a vehicle 702, which can correspond to an autonomous or semi-autonomous vehicle configured to perform various techniques described herein for generating and following vehicle trajectories to traverse driving environments, and for executing vehicle safety systems to detect and avoid and/or mitigate potential collisions. The example vehicle 702 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may or may not include a driver and/or controls for driving the vehicle 702, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 702 can include one or more first computing devices 704, one or more sensor systems 706, one or more emitters 708, one or more communication connections 710 (also referred to as communication devices and/or modems), at least one direct connection 712 (e.g., for physically coupling with the vehicle 702 to exchange data and/or to provide power), and one or more drive systems 714. The one or more sensor systems 706 can be configured to capture sensor data associated with an environment.

The sensor system(s) 706 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 706 can include multiple instances of any number of these and/or other types of sensors. For instance, the time-of-flight sensors can include individual time-of-flight sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the first computing device(s) 704.

The vehicle 702 can also include emitter(s) 708 for emitting light and/or sound. The emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 702 can also include communication connection(s) 710 that enable communication between the vehicle 702 and one or more other local or remote computing device(s) (e.g., a remote teleoperation computing device) or remote services. For instance, the communication connection(s) 710 can facilitate communication with other local computing device(s) on the vehicle 702 and/or the drive system(s) 714. Also, the communication connection(s) 710 can allow the vehicle 702 to communicate with other nearby computing device(s) (e.g., other nearby vehicles, traffic signals, etc.).

The communications connection(s) 710 can include physical and/or logical interfaces for connecting the first computing device(s) 704 to another computing device or one or more external networks 716 (e.g., the Internet). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4GLTE, 5G, etc.), satellite communication, dedicated short range communications (DSRC), or any suitable wired or wireless communications protocol that enables the respective computing device to interface with the other computing device(s).

In at least one example, the vehicle 702 can include drive system(s) 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include the sensor system(s) 706 to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) 706 on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) 706 and to control operation of the various vehicle systems. In some examples, the drive system controller can include one or more processor(s) and memory communicatively coupled with the one or more processor(s). The memory can store one or more components to perform various functionalities of the drive system(s) 714. Furthermore, the drive system(s) 714 also include one or more communication connection(s) that enable communication by the respective drive system with one or more other local or remote computing device(s).

As shown in this example, the vehicle 702 can include one or more second computing devices 718 to provide redundancy, error checking, and/or validation of determinations and/or commands determined by the first computing device(s) 704. For instance, the second computing devices 718 may implement a vehicle safety system, such as a vehicle safety system with an autonomous vehicle 302 and/or any other vehicle safety system described herein, which be provide a secondary or backup system to provide redundancy, error checking, and/or validation of the primary navigation systems of the vehicle 702.

By way of example, the first computing device(s) 704 may be considered to be a primary system, while the second computing device(s) 718 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of the sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from any number of the sensors, data from the same number of sensors as the primary system, etc.

The secondary system may implement any of the techniques of FIGS. 1-6D and 8-9, as described herein. For example, the secondary system may determine one or more safety areas utilized to control the vehicle. The secondary system may be a redundant backup system.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 704 can include one or more processors 720 and memory 722 communicatively coupled with the one or more processors 720. In the illustrated example, the memory 722 of the first computing device(s) 704 stores a localization component 724, a perception component 726, a prediction component 728, a planning component 730, a maps component 732, and one or more system controllers 734. Though depicted as residing in the memory 722 for illustrative purposes, it is contemplated that the localization component 724, the perception component 726, the prediction component 728, the planning component 730, the maps component 732, and the one or more system controllers 734 can additionally, or alternatively, be accessible to the first computing device(s) 704 (e.g., stored in a different component of vehicle 702 and/or be accessible to the vehicle 702 (e.g., stored remotely).

In memory 722 of the first computing device 704, the localization component 724 can include functionality to receive data from the sensor system(s) 706 to determine a position of the vehicle 702. For example, the localization component 724 can include and/or request/receive a three-dimensional map of an environment and can continuously determine a location of the autonomous vehicle within the map. In some instances, the localization component 724 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 724 can provide data to various components of the vehicle 702 to determine an initial position of an autonomous vehicle for generating a trajectory, as discussed herein.

The perception component 726 can include functionality to perform object detection, segmentation, and/or classification. In some examples, the perception component 726 can provide processed sensor data that indicates a presence of an entity that is proximate to the vehicle 702 and/or a classification of the entity as an entity type (e.g., car, pedestrian, cyclist, building, tree, road surface, curb, sidewalk, unknown, etc.). In additional or alternative examples, the perception component 726 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 726 can use perception algorithms to determine a perception based bounding box associated with an object in the environment based on sensor data. For example, the perception component 726 can receive image data and classify the image data to determine that an object is represented in the image data. Then, using detection algorithms, the perception component 726 can generate a two-dimensional bounding box and/or a perception based three-dimensional bounding box associated with the object. The perception component 726 can further generate a three-dimensional bounding box associated with the object. As discussed above, the three-dimensional bounding box can provide additional information such as a location, orientation, pose, and/or size (e.g., length, width, height, etc.) associated with the object.

The perception component 726 can include functionality to store perception data generated by the perception component 726. In some instances, the perception component 726 can determine a track corresponding to an object that has been classified as an object type. For purposes of illustration only, the perception component 726, using sensor system(s) 706 can capture one or more images of an environment. The sensor system(s) 706 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 702. Fused perception data can include a fusion or other combination of sensor data from sensor system(s) 706, such as image sensors, lidar sensors, radar sensors, time of flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 728 can generate one or more probability maps representing prediction probabilities of possible locations of one or more objects in an environment. For example, the prediction component 728 can generate one or more probability maps for vehicles, pedestrians, animals, and the like within a threshold distance from the vehicle 702. In some instances, the prediction component 728 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 730 can determine a path for the vehicle 702 to follow to traverse through an environment. For example, the planning component 730 can determine various routes and paths and various levels of detail. In some instances, the planning component 730 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 730 can generate an instruction for guiding the autonomous vehicle along at least a portion of the route from the first location to the second location. In at least one example, the planning component 730 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 730 can alternatively, or additionally, use data from the perception component 726 and/or the prediction component 728 to determine a path for the vehicle 702 to follow to traverse through an environment. For example, the planning component 730 can receive data from the perception component 726 and/or the prediction component 728 regarding objects associated with an environment. Using this data, the planning component 730 can determine a route to travel from a first location (e.g., a current location) to a second location (e.g., a target location) to avoid objects in an environment. In at least some examples, such a planning component 730 may determine there is no such collision free path and, in turn, provide a path which brings vehicle 702 to a safe stop avoiding all collisions and/or otherwise mitigating damage.

The memory 722 can further include one or more maps 732 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 732 can include at least one map (e.g., images and/or a mesh). In some examples, the vehicle 702 can be controlled based at least in part on the map(s) 732. That is, the map(s) 732 can be used in connection with the localization component 724, the perception component 726, the prediction component 728, and/or the planning component 730 to determine a location of the vehicle 702, identify objects in an environment, generate prediction probabilit(ies) associated with objects and/or the vehicle 702, and/or generate routes and/or trajectories to navigate within an environment.

In some examples, the one or more maps 732 can be stored on a remote computing device(s) (such as the computing device(s) 748) accessible via network(s) 716. In some examples, multiple maps 732 can be stored based on, for example, a characteristic (e.g., type of entity, time of day, day of week, season of the year, etc.). Storing multiple maps 732 can have similar memory requirements but can increase the speed at which data in a map can be accessed.

In at least one example, the first computing device(s) 704 can include one or more system controllers 734, which can be configured to control steering, propulsion, braking, safety, emitters, communication, and other systems of the vehicle 702. These system controller(s) 734 can communicate with and/or control corresponding systems of the drive system(s) 714 and/or other components of the vehicle 702, which may be configured to operate in accordance with a path provided from the planning component 730.

The second computing device(s) 718 can comprise one or more processors 736 and memory 738 including components to verify and/or control aspects of the vehicle 702, as discussed herein. In at least one instance, the one or more processors 736 can be similar to the processor(s) 720 and the memory 738 can be similar to the memory 722. However, in some examples, the processor(s) 736 and the memory 738 may comprise different hardware than the processor(s) 720 and the memory 722 for additional redundancy.

In some examples, the memory 738 can comprise a localization component 740, a perception/prediction component 742, a planning component 744, and one or more system controllers 746. Additionally, any one or more of the localization component 740, the perception/prediction component 742, the planning component 744 might not be implemented within the second computing device 718. For instance, a vehicle safety system may be implemented within the second computing device 718, separately and independent from the primary vehicle systems within the first computing device 704, and may receive the outputs (e.g., the detected objects and attributes, the current vehicle trajectory, the trajectories of detected objects, the velocity vectors, the localization data, etc.) from the components within the first computing device 704 (e.g., the localization component 724, the perception component 726, the prediction component 728, the planning component 730, etc.).

In some examples, the localization component 740 may receive sensor data from the sensor(s) 706 to determine one or more of a position and/or orientation (together a pose) of the autonomous vehicle 702. Here, the position and/or orientation may be relative to point(s) and/or object(s) in an environment in which the autonomous vehicle 702 is located. In examples, the orientation may include an indication of a yaw, roll, and/or pitch of the autonomous vehicle 702 relative to a reference plane and/or relative to point(s) and/or object(s). In examples, the localization component 740 may perform less processing than the localization component 724 of the first computing device(s) 704 (e.g., higher-level localization). For instance, the localization component 740 may not determine a pose of the autonomous vehicle 702 relative to a map, but merely determine a pose of the autonomous vehicle 702 relative to objects and/or surfaces that are detected around the autonomous vehicle 702 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 742 can include functionality to detect, identify, classify, and/or track object(s) represented in sensor data. For example, the perception/prediction component 742 can perform the clustering operations and operations to estimate or determine a height associated with objects, as discussed herein.

In some examples, the perception/prediction component 742 may comprise an M-estimator, but may lack an object classifier such as, for example, a neural network, decision tree, and/or the like for classifying objects. In additional or alternate examples, the perception/prediction component 742 may comprise an ML model of any type, configured to disambiguate classifications of objects. By contrast, the perception component 726 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 742 (and/or 726) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 742 may also process the input data to determine one or more predicted trajectories for an object. For example, based on a current position of an object and a velocity of the object over a period of a few seconds, the perception/prediction component 742 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 744 can include functionality to receive a trajectory from the planning component 730 to validate that the trajectory is free of collisions and/or is within safety margins. In some examples, the planning component 744 can generate a safe stop trajectory (e.g., a trajectory to stop the vehicle 702 with a "comfortable" deacceleration (e.g., less than maximum deceleration)) and in some examples the planning component 744 can generate an emergency stop trajectory (e.g., maximum deceleration with or without steering inputs).

In some examples, the system controller(s) 746 can include functionality to control safety critical components (e.g., steering, braking, motors, etc.) of the vehicle. In this manner, the second computing device(s) 718 can provide redundancy and/or an additional hardware and software layer for vehicle safety.

The vehicle 702 can connect to computing device(s) 748 via the network 716 and can include one or more processors 750 and memory 752 communicatively coupled with the one or more processors 750. In at least one instance, the one or more processors 750 can be similar to the processor(s) 720 and the memory 752 can be similar to the memory 722. In some cases, the computing device(s) 748 may correspond to one or more validation servers configured to generate and execute simulation tests on autonomous vehicle components. For instance, in the illustrated example the memory 752 of the computing device(s) 748 stores a simulation system 754, which may correspond to the simulation system 304 described above and/or may perform any combination of the functionality of simulation systems described herein.

The processor(s) 720, 736, and/or 750 can be any suitable processor capable of executing instructions to process data and perform operations as described herein. By way of example and not limitation, the processor(s) 720, 736, and/or 750 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 722, 738, and/or 752 are examples of non-transitory computer-readable media. The memory 722, 738, and/or 752 can store an operating system and one or more software applications, instructions, programs, and/or data to implement the methods described herein and the functions attributed to the various systems. In various examples, the memory 722, 738, and/or 752 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 722, 738, and/or 752 can be implemented as a neural network. In some examples, the components in the memory 722, 738, and/or 752 may not include machine learning algorithms (or may include simplified or verifiable machine learned algorithms) to reduce complexity and to be verified and/or certified from a safety standpoint.

As described herein, an exemplary neural network is a biologically inspired algorithm which passes input data through a series of connected layers to produce an output. Any number of the layers in a neural network can comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Figure 8:
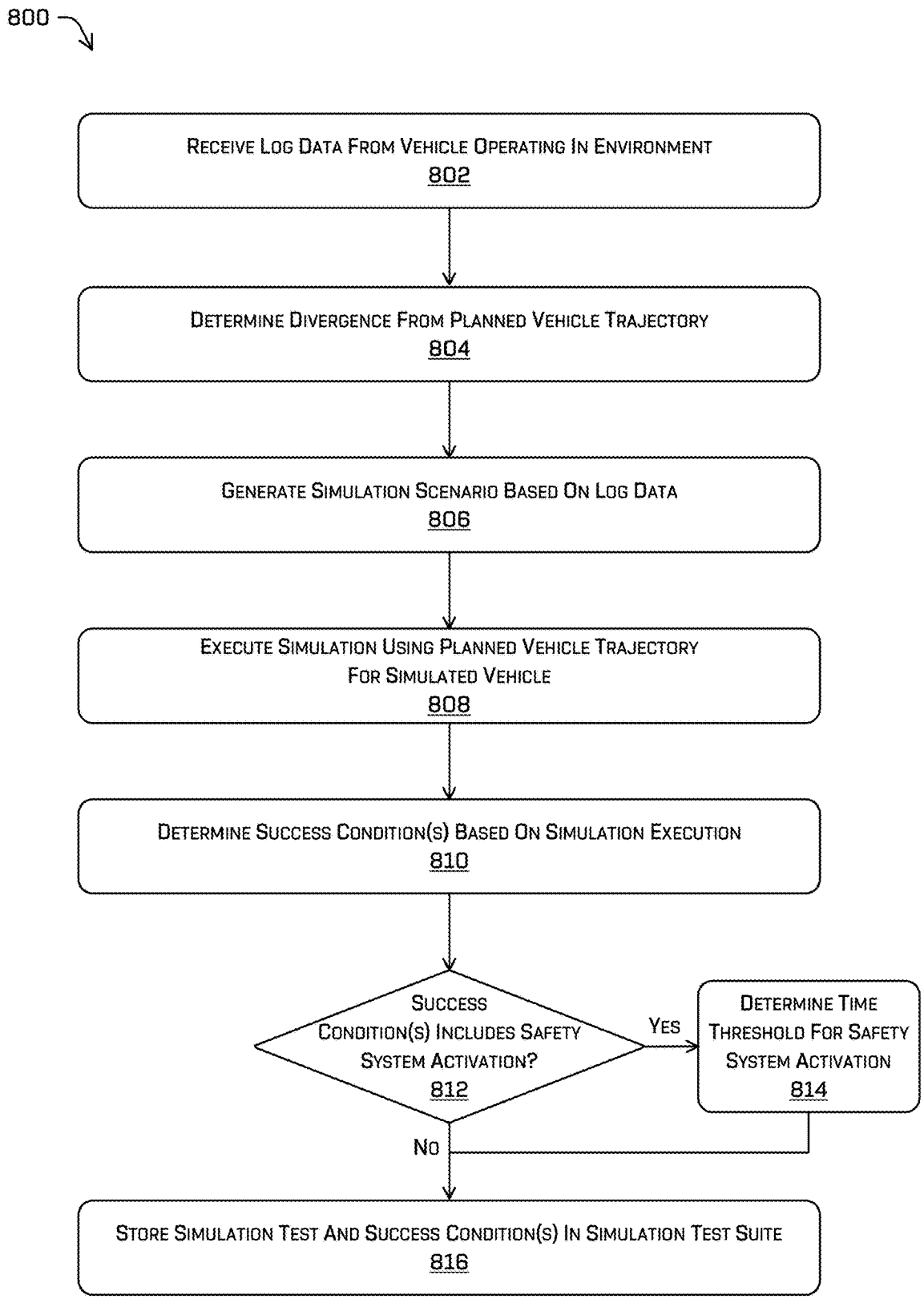
FIG. 8 is a flow diagram illustrating an example process of generating a driving simulation and success conditions associated with validating a vehicle safety system, in accordance with one or more implementations of the disclosure.
Figure 9:
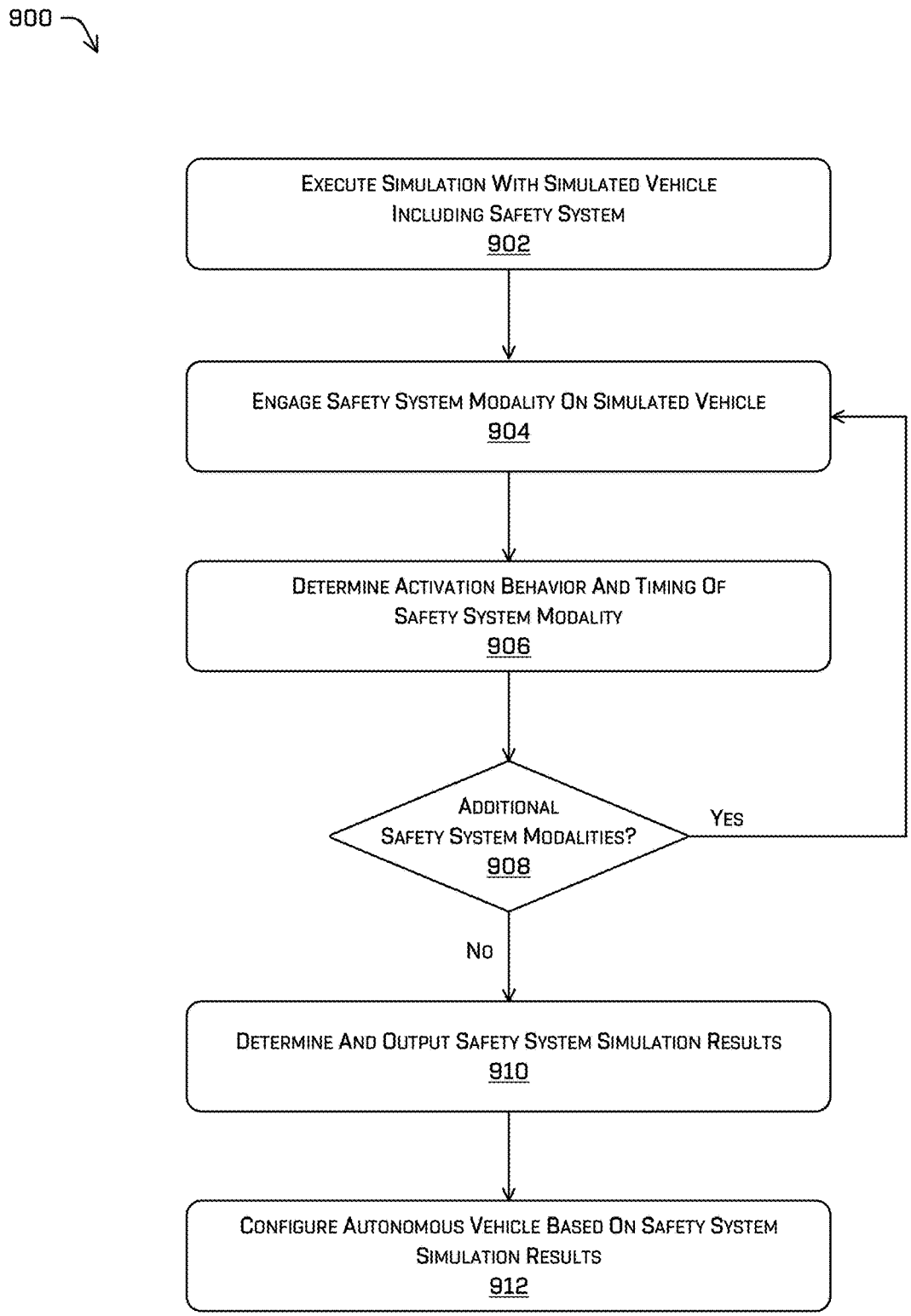
FIG. 9 is a flow diagram illustrating an example process of validating a vehicle safety system based on a driving simulation, in accordance with one or more implementations of the disclosure.

FIG. 8 depicts an example process 800 for generating a driving simulation and determining the success conditions for validating a vehicle safety system. FIG. 9 depicts another example process 900 of validating a vehicle safety system based on a driving simulation and the validation success conditions. As described below, process 800 and/or process 900 may be performed by a simulation system 304 in communication with one or more autonomous vehicles 302.

Process 800 and process 900 are illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures, or environments.

At operation 802, the simulation system 304 may receive log data from a vehicle 302 operating in an environment. As described above, the vehicle 302 capturing the log data may include any number of autonomous or semi-autonomous vehicles. The log data may include various sensor data, perception data, prediction data, trajectory information, and the like. As noted above, in some examples the log data may include data indicating an activations of the safety system and/or a disengagements of the autonomous driving functionality by a driver or safety operator.

At operation 804, the simulation system 304 may analyze the log data to determine an instance in which the vehicle 302 diverged from a planned trajectory while traversing a driving environment. As noted above, a planned trajectory may include a trajectory generated by a route planning component of the vehicle 302. A divergence from the planned trajectory may be caused by a number of possible events or interventions, such as a disengagement of the driving functionality on the vehicle 302 (e.g., by a driver or safety operator), an activation of a vehicle safety system to avoid a potential collision, an impact to the vehicle and/or or a malfunction of an internal vehicle component.

At operation 806, the simulation system 304 may generate a driving simulation based on the log data captured by the vehicle. To generate a driving simulation that includes the log data associated with the divergence from the planned trajectory, the simulation system 304 may determine the temporal boundaries of the relevant log data based on the divergence. The simulation system 304 may then perform various features and functionality, including log data extraction, filtering, and object detection, to generate a simulation based on the log data scenario.

At operation 808, the simulation system 304 may execute the driving simulation determined in operation 806. As discussed above, the simulation system 304 may instantiate and control a simulated vehicle based on the autonomous vehicle that captured the log data. However, the simulated vehicle may be controlled to continue following the same planned trajectory of the autonomous vehicle throughout the simulation, rather than diverging from the planned trajectory as did the autonomous vehicle. For the other dynamic objects in the simulation, the simulation system 304 may use the same trajectories for the objects from the log data (e.g., object trajectory 208 in driving simulation 200), or may modify the trajectories based on the modification of the simulated vehicle trajectory (e.g., revised trajectory 614 in driving simulation 600).

At operation 810, the simulation system 304 may determine the success conditions for the vehicle safety system, based on the results of the simulation executed in operation 808. The success conditions for the performance of the vehicle safety system may correspond to the desired behavior of the vehicle safety system during the simulation. In various examples, based on the results of the simulation, the success conditions may include activating or not activating the vehicle safety system during the course of the simulation. When the success conditions call for activation of the vehicle safety system, additional success conditions may include one or time thresholds (or time window) during which the safety system should be activated. As discussed above, determining the success conditions for the vehicle safety system may be performed by the simulation system 304 using entirely automated processes and/or a combination of automated and manual processes. In some cases, the simulation system 304 may output a visual representation of the simulation via a user interface, and may receive input from a safety operator determining a simulation result (e.g., a near-miss collision, a dangerous maneuver, etc.) and may provide a corresponding success condition for the simulation (e.g., activating the safety system before a particular simulation time or location, etc.).

At operation 812, the simulation system 304 may determine whether or not the success condition for the simulation includes activating the vehicle safety system. When the success condition does include activating the vehicle safety system (812:Yes), then in operation 814 the simulation system 304 may determine additional success conditions associated with the vehicle safety system activation. For instance, the simulation system 304 may determine one or more time thresholds, and/or particular modalities of the vehicle safety system to be activated during the simulation. In contrast, when the success condition does not include activating the vehicle safety system (812:No), or after completion of operation 814, then in operation 816 the simulation system may store the simulation test and associated success conditions in a simulation test suite. For example, the simulation and associated success conditions may be stored in a safety system validation data store 328. As discussed above, the structure of the safety system validation data store 328 may include support for real-world driving risk analytics based on the performance of the vehicle safety system, and may include labeling for more granular testing of vehicle safety systems in different driving environments, conditions, and scenario types.

As noted above, FIG. 9 depicts an example process 900 of validating a vehicle safety system based on a driving simulation and the validation success conditions. For instance, the driving simulation and success conditions determined and stored in process 800 may be retrieved and used in process 900 to validate the behavior and/or performance of a particular implementation (e.g., build, version, etc.) of a vehicle safety system for autonomous vehicle.

At operation 902, the simulation system 304 may retrieve and execute a driving simulation. As noted above, the simulation may be similar or identical to a driving simulation generated in process 800. When executing a simulation, the simulation system 304 may use vehicle controller(s) including an operational vehicle safety system to control a simulated vehicle within the simulated environment. The simulated vehicle may begin the simulation at the same relative position and state as the autonomous vehicle the captured the log data, and initially may follow the same planned trajectory as the autonomous vehicle. The simulated vehicle may be controlled using the autonomous vehicle controller throughout the simulation, and need not have the capability to disengage autonomous driving functionality.

At operation 904, the simulation system 304 may engage a particular modality of the vehicle safety system for the simulated vehicle. As noted above, a vehicle safety system may include multiple independent modalities, any of which may be capable of activating the safety system. In this example, a first modality of the vehicle safety system may be engaged in operation 904, while the other independent modalities remain disengaged, so that the simulation test may accurately test the first modality without being affected by the behavior of the other modalities.

At operation 906, the simulation system 304 may determine an activation behavior of the engaged modality of the vehicle safety system. As described above, the activation behavior may include whether or the vehicle safety system was activated, and if so, when during the simulation was the vehicle safety system activated. In some examples, the activation behavior may include additional data such as any causes of the activation (e.g., a triggering of an object distance threshold, etc.), and/or any relevant data that may be recorded by the vehicle safety system associated with the activation.

At operation 908, the simulation system 304 may determine whether any additional modalities of the vehicle safety system have not yet been tested with the driving simulation. In this example, when one or more additional modalities of the vehicle safety system are available to be tested (908: Yes), then process 900 may return to operation 904 in which the currently engaged modality is disengaged and a new modality of the vehicle safety system may be engaged. In contrast, when no additional modalities of the vehicle safety system remain to be tested (908:No), then process 900 may proceed to operation 910.

As discussed above, the vehicle safety system may include multiple independent modalities, any number of which is capable of activating the safety system. In some examples, the simulation system 304 may execute separate simulations for any or all of the independent modalities, to determine the activation behavior/timing of the modalities in operation 906. In other examples, the simulation system 304 may execute a single simulation and multiple independent modalities may be validated using the single simulation. Such examples may provide additional efficiency and performance advantages in some cases, because generating and executing a driving simulation (e.g., a three-dimensional simulation with full sensor data) may be relatively computationally expensive compared with evaluating a new safety system modality based on a previously run driving simulation (e.g., using log data from the previous simulation). As noted above, different modalities may be engaged/disengaged while rerunning the log data from the driving simulation, to determine the output from the various safety system modalities. In other cases, the simulation system 304 may execute the various safety system modalities simultaneously and may record the outputs of the modalities for validation, while disconnecting the outputs of the safety system from controlling the operation of the simulated vehicle. Such cases may allow for efficient and simultaneous execution of any number of various safety system modalities, while preventing the activation of one modality from affecting the operation of any of the other modalities.

At operation 910, the simulation system 304 may aggregate and output the simulation results for the vehicle safety system. As discussed above in reference to table 504, the simulation results associated with a vehicle safety system may indicate which modalities did and did not activate, the times within the simulation that the modalities were activated.

At operation 912, the simulation system 304 may configure one or more autonomous vehicles 302 based on the vehicle safety system simulation results. The configuration of an autonomous vehicle 302 to use a vehicle safety system may be performed directly or indirectly the simulation system 304. For example, the simulation system 304 may compare the simulation test results of the vehicle safety system to one or more performance thresholds, after running a test suite or battery of simulation tests. When the test results of the vehicle safety system meet or exceed a performance threshold, the vehicle safety system may be transmitted to an autonomous vehicle (or fleet of vehicles) for use in real-world driving operations by the autonomous vehicle(s). In some cases, the performance threshold may be associated with a regression testing and validation process for new builds or versions of a vehicle safety system. Additionally, in some examples, the simulation system 304 may determine particular vehicle safety systems to be transmitted to particular autonomous vehicles, based on the test results for a specific subset of simulation tests. For instance, based on a particular build/version of a vehicle safety system satisfying a performance threshold for a specific type of driving scenario, geographic region, and/or driving conditions, the simulation system 304 may provide the particular build/version to a subset of autonomous vehicles that operate in the same specific driving conditions, geographic region, and/or frequently traverse the same specific driving scenario(s).

Example Clauses

A. A system comprising: one or more processors; and one or more non-transitory computer-readable media storing computer-executable instructions that, when executed, cause the system to perform operations comprising: receiving log data associated with a vehicle, the log data representing a driving scenario of the vehicle operating in an environment; determining a log time within the log data at which the vehicle diverges from a trajectory generated by a route planning component of the vehicle; executing a simulation representing the driving scenario, wherein executing the simulation includes: controlling a simulated vehicle to follow the trajectory within the simulation, from a first simulation time associated with the log time, to a second simulation time after the first simulation time; and determining, at the second simulation time, a distance between the simulated vehicle and a simulated object within the simulation; determining, based at least in part on the distance, a success condition associated with the simulation; determining a response of a safety system to a simulated driving scenario, based at least in part on the success condition; and configuring an autonomous vehicle to use the safety system, based at least in part on the response of the safety system to the simulated driving scenario.

B. The system as recited in paragraph A, wherein determining the log time comprises at least one of: determining, based at least in part on the log data, that a safety system of the vehicle was activated at the log time; or determining, based at least in part on the log data, that an autonomous driving feature of the vehicle was disengaged at the log time.

C. The system as recited in paragraph A, wherein determining the success condition associated with the simulation comprises: determining a potential collision time within the simulation, for a potential collision between the simulated vehicle and the simulated object; and determining, based at least in part on the potential collision time, an activation time threshold within the driving scenario for a safety system.

D. The system as recited in paragraph A, wherein determining the response of the safety system to the simulated driving scenario comprises: executing a second simulation representing the driving scenario, wherein the second simulation includes a second simulated vehicle associated with the safety system; determining a vehicle state difference between a first state of the vehicle within the log data, and a second state of the second simulated vehicle during the second simulation; generating, based at least in part on the vehicle state difference, modified log data associated with a second simulated object in the second simulation; and providing the modified log data to the second simulated vehicle during the second simulation.

E. The system as recited in paragraph A, wherein executing the simulation further includes disabling a safety system associated with the simulated vehicle between the first simulation time and the second simulation time.

F. A method comprising: receiving log data comprising a driving scenario of a vehicle operating in an environment; determining, based at least in part on the log data, an event time associated with an event indicative of an impact on nominal operation of the vehicle; executing a simulation representing the driving scenario, wherein executing the simulation includes: determining, from the log data, a trajectory determined by the vehicle at the event time; and controlling a simulated vehicle to follow the trajectory within the simulation, from a first simulation time associated with the event time, to a second simulation time; and determining, based at least in part on a state of the simulated vehicle relative to a simulated object at the second simulation time, a success condition associated with the simulation, wherein the success condition includes a vehicle safety system behavior.

G. The method of paragraph F, wherein determining the event time comprises at least one of: determining an error associated with the log data at the event time; determining, based at least in part on the log data, that a safety system of the vehicle was activated at the event time; or determining, based at least in part on the log data, that an autonomous driving feature of the vehicle was disengaged at the event time.

H. The method of paragraph F, wherein determining the success condition associated with the simulation comprises: determining a potential collision time within the simulation, for a potential collision between the simulated vehicle and the simulated object; and determining, based at least in part on the potential collision time, an activation time threshold within the driving scenario for a safety system of the vehicle.

I. The method of paragraph F, wherein executing the simulation further includes disabling a safety system associated with the simulated vehicle between the first simulation time and the second simulation time.

J. The method of paragraph F, further comprising: executing a second simulation representing the driving scenario, to determine a response of a safety system associated with a second simulated vehicle; determining, based at least in part on the response of the safety system associated with the second simulated vehicle and the success condition, a result of the second simulation; and configuring an autonomous vehicle to use the safety system associated with the second simulated vehicle, based at least in part on the result of the second simulation.

K. The method of paragraph J, wherein executing the second simulation comprises: determining a perturbed object associated with the simulated object, the perturbed object comprising a perturbation to an attribute of the simulated object; and determining the second simulation as a perturbed driving simulation representing the driving scenario, wherein the perturbed driving simulation includes the perturbed object.

L. The method of paragraph J, wherein the safety system associated with the second simulated vehicle includes a first modality capable of activating the safety system and a second modality capable of activating the safety system, wherein the first modality and the second modality operate independently from one another, and wherein executing the second simulation comprises: determining a first response of the first modality to the second simulation; and determining a second response of the second modality to the second simulation.

M. The method of paragraph J, wherein executing the second simulation comprises: determining a vehicle state difference between a first state of the vehicle within the log data, and a second state of the second simulated vehicle during the second simulation; generating, based at least in part on the vehicle state difference, modified log data associated with a second simulated object in the second simulation; and providing the modified log data to the second simulated vehicle during the second simulation.

N. One or more non-transitory computer-readable media storing processor-executable instructions that, when executed by one or more processors, cause the one or more processors to perform operations comprising: receiving log data comprising a driving scenario of a vehicle operating in an environment; determining, based at least in part on the log data, an event time associated with an event indicative of an impact on nominal operation of the vehicle; executing a simulation representing the driving scenario, wherein executing the simulation includes: determining, from the log data, a trajectory determined by the vehicle at the event time; and controlling a simulated vehicle to follow the trajectory within the simulation, from a first simulation time associated with the event time, to a second simulation time; and determining, based at least in part on a state of the simulated vehicle relative to a simulated object at the second simulation time, a success condition associated with the simulation, wherein the success condition includes a vehicle safety system behavior.

O. The one or more non-transitory computer-readable media of paragraph N, wherein determining the event time comprises at least one of: determining an error associated with the log data at the event time; determining, based at least in part on the log data, that a safety system of the vehicle was activated at the event time; or determining, based at least in part on the log data, that an autonomous driving feature of the vehicle was disengaged at the event time.

P. The one or more non-transitory computer-readable media of paragraph N, wherein determining the success condition associated with the simulation comprises: determining a potential collision time within the simulation, for a potential collision between the simulated vehicle and the simulated object; and determining, based at least in part on the potential collision time, an activation time threshold within the driving scenario for a safety system of the vehicle.

Q. The one or more non-transitory computer-readable media of paragraph N, wherein executing the simulation further includes disabling a safety system associated with the simulated vehicle between the first simulation time and the second simulation time.

R. The one or more non-transitory computer-readable media of paragraph N, the operations further comprising: executing a second simulation representing the driving scenario, to determine a response of a safety system associated with a second simulated vehicle; determining, based at least in part on the response of the safety system associated with the second simulated vehicle and the success condition, a result of the second simulation; and configuring an autonomous vehicle to use the safety system associated with the second simulated vehicle, based at least in part on the result of the second simulation.

S. The one or more non-transitory computer-readable media of paragraph R, wherein executing the second simulation comprises: determining a perturbed object associated with the simulated object, the perturbed object comprising a perturbation to an attribute of the simulated object; and determining the second simulation as a perturbed driving simulation representing the driving scenario, wherein the perturbed driving simulation includes the perturbed object.

T. The one or more non-transitory computer-readable media of paragraph R, wherein the safety system associated with the second simulated vehicle includes a first modality capable of activating the safety system and a second modality capable of activating the safety system, wherein the first modality and the second modality operate independently from one another, and wherein executing the second simulation comprises: determining a first response of the first modality to the second simulation; and determining a second response of the second modality to the second simulation.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
receiving log data associated with a vehicle, the log data representing a driving scenario of the vehicle operating in an environment;
determining a log time within the log data at which the vehicle diverges from a trajectory generated by a route planning component of the vehicle;
executing a simulation representing the driving scenario, wherein executing the simulation includes:
controlling a simulated vehicle to follow the trajectory within the simulation, from a first simulation time associated with the log time, to a second simulation time after the first simulation time; and
determining, at the second simulation time, a distance between the simulated vehicle and a simulated object within the simulation;
determining, based at least in part on the distance, a success condition associated with the simulation;
determining a response of a safety system to a simulated driving scenario, based at least in part on the success condition; and
configuring an autonomous vehicle to use the safety system, based at least in part on the response of the safety system to the simulated driving scenario.

2. The system as recited in claim 1, wherein determining the log time comprises at least one of:
determining, based at least in part on the log data, that a safety system of the vehicle was activated at the log time; or
determining, based at least in part on the log data, that an autonomous driving feature of the vehicle was disengaged at the log time.

3. The system as recited in claim 1, wherein determining the success condition associated with the simulation comprises:
  determining a potential collision time within the simulation, for a potential collision between the simulated vehicle and the simulated object; and
  determining, based at least in part on the potential collision time, an activation time threshold within the driving scenario for a safety system.

4. The system as recited in claim 1, wherein determining the response of the safety system to the simulated driving scenario comprises:
  executing a second simulation representing the driving scenario, wherein the second simulation includes a second simulated vehicle associated with the safety system;
  determining a vehicle state difference between a first state of the vehicle within the log data, and a second state of the second simulated vehicle during the second simulation;
  generating, based at least in part on the vehicle state difference, modified log data associated with a second simulated object in the second simulation; and
  providing the modified log data to the second simulated vehicle during the second simulation.

5. The system as recited in claim 1, wherein executing the simulation further includes disabling a safety system associated with the simulated vehicle between the first simulation time and the second simulation time.

6. A method comprising:
  receiving log data comprising a driving scenario of a vehicle operating in an environment;
  determining, based at least in part on the log data, an event time associated with an event indicative of an impact on nominal operation of the vehicle;
  executing a simulation representing the driving scenario, wherein executing the simulation includes:
    determining, from the log data, a trajectory determined by the vehicle at the event time; and
    controlling a simulated vehicle to follow the trajectory within the simulation, from a first simulation time associated with the event time, to a second simulation time; and
  determining, based at least in part on a state of the simulated vehicle relative to a simulated object at the second simulation time, a success condition associated with the simulation, wherein the success condition includes a vehicle safety system behavior.

7. The method of claim 6, wherein determining the event time comprises at least one of:
  determining an error associated with the log data at the event time;
  determining, based at least in part on the log data, that a safety system of the vehicle was activated at the event time; or
  determining, based at least in part on the log data, that an autonomous driving feature of the vehicle was disengaged at the event time.

8. The method of claim 6, wherein determining the success condition associated with the simulation comprises:
  determining a potential collision time within the simulation, for a potential collision between the simulated vehicle and the simulated object; and
  determining, based at least in part on the potential collision time, an activation time threshold within the driving scenario for a safety system of the vehicle.

9. The method of claim 6, wherein executing the simulation further includes disabling a safety system associated with the simulated vehicle between the first simulation time and the second simulation time.

10. The method of claim 6, further comprising:
  executing a second simulation representing the driving scenario, to determine a response of a safety system associated with a second simulated vehicle;
  determining, based at least in part on the response of the safety system associated with the second simulated vehicle and the success condition, a result of the second simulation; and
  configuring an autonomous vehicle to use the safety system associated with the second simulated vehicle, based at least in part on the result of the second simulation.

11. The method of claim 10, wherein executing the second simulation comprises:
  determining a perturbed object associated with the simulated object, the perturbed object comprising a perturbation to an attribute of the simulated object; and
  determining the second simulation as a perturbed driving simulation representing the driving scenario, wherein the perturbed driving simulation includes the perturbed object.

12. The method of claim 10, wherein the safety system associated with the second simulated vehicle includes a first modality capable of activating the safety system and a second modality capable of activating the safety system, wherein the first modality and the second modality operate independently from one another, and wherein executing the second simulation comprises:
  determining a first response of the first modality to the second simulation; and
  determining a second response of the second modality to the second simulation.

13. The method of claim 10, wherein executing the second simulation comprises:
  determining a vehicle state difference between a first state of the vehicle within the log data, and a second state of the second simulated vehicle during the second simulation;
  generating, based at least in part on the vehicle state difference, modified log data associated with a second simulated object in the second simulation; and
  providing the modified log data to the second simulated vehicle during the second simulation.

14. One or more non-transitory computer-readable media storing processor-executable instructions that, when executed by one or more processors, cause the one or more processors to perform operations comprising:
  receiving log data comprising a driving scenario of a vehicle operating in an environment;
  determining, based at least in part on the log data, an event time associated with an event indicative of an impact on nominal operation of the vehicle;
  executing a simulation representing the driving scenario, wherein executing the simulation includes:
    determining, from the log data, a trajectory determined by the vehicle at the event time; and
    controlling a simulated vehicle to follow the trajectory within the simulation, from a first simulation time associated with the event time, to a second simulation time; and
  determining, based at least in part on a state of the simulated vehicle relative to a simulated object at the second simulation time, a success condition associated with the simulation, wherein the success condition includes a vehicle safety system behavior.

15. The one or more non-transitory computer-readable media of claim 14, wherein determining the event time comprises at least one of:
   determining an error associated with the log data at the event time;
   determining, based at least in part on the log data, that a safety system of the vehicle was activated at the event time; or
   determining, based at least in part on the log data, that an autonomous driving feature of the vehicle was disengaged at the event time.

16. The one or more non-transitory computer-readable media of claim 14, wherein determining the success condition associated with the simulation comprises:
   determining a potential collision time within the simulation, for a potential collision between the simulated vehicle and the simulated object; and
   determining, based at least in part on the potential collision time, an activation time threshold within the driving scenario for a safety system of the vehicle.

17. The one or more non-transitory computer-readable media of claim 14, wherein executing the simulation further includes disabling a safety system associated with the simulated vehicle between the first simulation time and the second simulation time.

18. The one or more non-transitory computer-readable media of claim 14, the operations further comprising:
   executing a second simulation representing the driving scenario, to determine a response of a safety system associated with a second simulated vehicle;
   determining, based at least in part on the response of the safety system associated with the second simulated vehicle and the success condition, a result of the second simulation; and
   configuring an autonomous vehicle to use the safety system associated with the second simulated vehicle, based at least in part on the result of the second simulation.

19. The one or more non-transitory computer-readable media of claim 18, wherein executing the second simulation comprises:
   determining a perturbed object associated with the simulated object, the perturbed object comprising a perturbation to an attribute of the simulated object; and
   determining the second simulation as a perturbed driving simulation representing the driving scenario, wherein the perturbed driving simulation includes the perturbed object.

20. The one or more non-transitory computer-readable media of claim 18, wherein the safety system associated with the second simulated vehicle includes a first modality capable of activating the safety system and a second modality capable of activating the safety system, wherein the first modality and the second modality operate independently from one another, and wherein executing the second simulation comprises:
   determining a first response of the first modality to the second simulation; and
   determining a second response of the second modality to the second simulation.

\* \* \* \* \*